(12) United States Patent
Wyman et al.

(10) Patent No.: US 11,794,138 B2
(45) Date of Patent: Oct. 24, 2023

(54) MICROGRAVITY SYSTEM PHASE SEPARATOR

(71) Applicant: Sierra Space Corporation, Broomfield, CO (US)

(72) Inventors: Daniel Aaron Wyman, Madison, WI (US); Michael Peterson, Verona, WI (US)

(73) Assignee: Sierra Space Corporation, Broomfield, CO (US)

( * ) Notice: Subject to any disclaimer, the term of this patent is extended or adjusted under 35 U.S.C. 154(b) by 149 days.

(21) Appl. No.: 17/074,276

(22) Filed: Oct. 19, 2020

(65) Prior Publication Data

US 2022/0118388 A1    Apr. 21, 2022

(51) Int. Cl.
*B01D 45/00* (2006.01)
*B01D 53/26* (2006.01)

(52) U.S. Cl.
CPC ........... *B01D 45/00* (2013.01); *B01D 53/265* (2013.01); *B01D 53/261* (2013.01)

(58) Field of Classification Search
CPC .... B01D 45/00; B01D 53/265; B01D 53/261; B01D 2256/10; B01D 2257/80; B01D 2258/06; B01D 2259/4575; B01D 53/268
See application file for complete search history.

(56) References Cited

U.S. PATENT DOCUMENTS

| | | | | |
|---|---|---|---|---|
| 409,658 A | * | 8/1889 | Baker | B04C 5/081 55/460 |
| 2,193,460 A | * | 3/1940 | Loumiet | B01D 5/0006 55/461 |

(Continued)

FOREIGN PATENT DOCUMENTS

| | | | | |
|---|---|---|---|---|
| CA | 3086192 A1 | * | 3/2019 | ............. B01D 45/12 |
| CN | 108030633 A | * | 5/2018 | ............... A61C 1/02 |

(Continued)

OTHER PUBLICATIONS

Concus, P., Finn, R., "On the Behavior of a Capillary Surface in a Wedge," Proceedings of the National Academy of Sciences of the United States of America, vol. 63, No. 2, 1969, pp. 292-299.

(Continued)

*Primary Examiner* — Dung H Bui
(74) *Attorney, Agent, or Firm* — Mintz Levin Cohn Ferris Glovsky and Popeo, P.C.

(57) ABSTRACT

An apparatus and related methods to separate liquid from a liquid/gas mixture, particularly in a low gravity environment. The apparatus includes a chamber having a capillary channel around a perimeter of the chamber, a liquid/gas inlet to the chamber, a liquid outlet from the chamber, the liquid outlet being positioned at the perimeter of the chamber to remove liquid from the capillary channel, and a gas outlet from the chamber. The gas outlet is positioned in the chamber, away from the capillary channel, to remove gas from the chamber. The chamber is structured to be readily fabricated using traditional machining techniques or additive manufacturing techniques. The chamber may be fabricated from various materials, including, for example, polymers, metals, composites, and ceramics. The chamber may function as a heat exchanger so that the apparatus can remove condensable vapors from the gas in the mixture in addition to what is already liquid.

16 Claims, 16 Drawing Sheets

(56) References Cited

U.S. PATENT DOCUMENTS

| | | | | |
|---|---|---|---|---|
| 2,616,563 | A * | 11/1952 | Hebb | B04C 5/12 |
| | | | | 210/512.1 |
| 4,244,708 | A * | 1/1981 | Bielefeldt | B04C 3/00 |
| | | | | 95/271 |
| 4,363,641 | A * | 12/1982 | Finn, III | B04C 7/00 |
| | | | | 55/460 |
| 4,461,742 | A * | 7/1984 | Rowe | B01J 19/2405 |
| | | | | 422/224 |
| 4,678,588 | A * | 7/1987 | Shortt | B01D 45/16 |
| | | | | 210/512.1 |
| 4,900,345 | A * | 2/1990 | le Jeune | B65G 53/60 |
| | | | | 406/171 |
| 5,248,421 | A * | 9/1993 | Robertson | B01D 17/0217 |
| | | | | 210/512.1 |
| 5,428,963 | A * | 7/1995 | Korycki | B01D 53/265 |
| | | | | 62/910 |
| 5,591,253 | A * | 1/1997 | Altman | B04C 5/04 |
| | | | | 96/61 |
| 5,683,494 | A * | 11/1997 | Altman | B04C 5/04 |
| | | | | 96/96 |
| 6,878,187 | B1 * | 4/2005 | Hays | B01D 47/05 |
| | | | | 95/219 |
| 7,905,946 | B1 * | 3/2011 | Weislogel | B01D 45/06 |
| | | | | 95/271 |
| 8,187,553 | B2 * | 5/2012 | Lee | B01L 3/502753 |
| | | | | 422/600 |
| 8,419,833 | B2 * | 4/2013 | Elms | E21B 43/36 |
| | | | | 96/204 |
| 8,679,235 | B1 * | 3/2014 | Wiederin | G01N 1/2211 |
| | | | | 95/271 |
| 8,696,799 | B2 * | 4/2014 | Steinman | F02M 25/0872 |
| | | | | 55/455 |
| 8,747,524 | B2 * | 6/2014 | Chen | B01D 45/12 |
| | | | | 55/482 |
| 8,979,958 | B2 * | 3/2015 | da Silva | B01D 46/2411 |
| | | | | 96/155 |
| 8,986,412 | B2 * | 3/2015 | Jansen | F23J 13/00 |
| | | | | 55/423 |
| 9,366,206 | B2 * | 6/2016 | Myers | B01D 45/12 |
| 9,416,026 | B2 | 8/2016 | Californiaa | |
| 2004/0163369 | A1 * | 8/2004 | Lombana | B01D 45/12 |
| | | | | 55/452 |
| 2005/0109209 | A1 * | 5/2005 | Lee | B01D 45/12 |
| | | | | 95/149 |
| 2006/0000111 | A1 * | 1/2006 | Cho | D06F 58/24 |
| | | | | 34/604 |
| 2018/0363277 | A1 * | 12/2018 | Greer | E03B 3/28 |
| 2019/0176057 | A1 * | 6/2019 | Mendez | H01M 10/625 |
| 2020/0122084 | A1 * | 4/2020 | Henson | B01D 53/265 |
| 2020/0368658 | A1 * | 11/2020 | Alejandre | B04C 11/00 |

FOREIGN PATENT DOCUMENTS

| | | | | |
|---|---|---|---|---|
| FR | 2591675 A1 * | 6/1987 | | B01D 45/00 |
| WO | WO-2018036905 A1 * | 3/2018 | | B01D 45/00 |

OTHER PUBLICATIONS

Jenson, R. et al. (2014). "Passive phase separation of microgravity bubbly flows using conduit geometry," International Journal Of Multiphase Flow, Elsevier, Amsterdam, NL, vol. 65, Jun. 6, 2014, pp. 68-81, XP029013300, ISSN: 0301-9322.

Metz, T. et al. (2009). "Capillary driven movement of gas bubbles in tapered structures." Microfluid Nanofluid, vol. 9, No. 2-39, pp. 341-355. XP019811134, ISSN: 1613-4990.

Roydhouse, M.D. et al. (2014). "Operating ranges of gas-liquid capillary microseparators: Experiments and theory." Chemical Engineering Science, vol. 114, pp. 30-39, XP055883740, ISSN:0009-2509.

Weislogel, M. et al. (2019). "Passive no moving parts capillary solutions for spacecraft life support systems." Jul. 7, 2019. pp. 1-7, XP055894048, Retrieved on Feb. 21, 2022.

* cited by examiner

MICROGRAVITY SYSTEM PHASE SEPARATOR

TECHNICAL FIELD

The present disclosure relates generally to phase separator devices, and more particularly to phase separator devices and related methods of use in low-gravity environments.

BACKGROUND

Since the beginning of space travel, there has been a need for smart consumption and recycling and reusing of liquids. In addition, space environments offer unique challenges of power usage and the space available for these recycling systems. Power must be smartly consumed to power the space environments and ensure power consumption for those environments. Systems and electronics on those space environments may necessitate efficient power consumption and engineering specific to conserve power and consume very little space. Therefore, there is a need for a low-power, low-mass liquid collection apparatus.

An example of collecting water in space is disclosed in U.S. Pat. No. 9,416,026. The '026 patent discloses coating a surface of a spaceship with a drying agent to capture ambient water moisture from space as it impinges on the spaceship. The '026 patent focuses on the external collection of water in space versus the recycling and reusing of water internal to a space vehicle.

There are many systems that operate with only gas or only liquid, for which mixed phase flows can impair operation or damage the system. If such systems are downstream of a process that produces mixed phase flow, a phase separator is required to separate the gas and liquid phases. This problem becomes even more challenging in a microgravity environment, in which bubbles do not passively separate from liquid due to buoyancy. Additionally, vapor in a gas flow can later condense into a liquid if the temperature decreases, so removing condensable vapors from a gas flow is a related problem.

Thus, there is a need for a system that addresses the problems of separating gas and liquid phases from a mixed liquid/gas flow, and of removing condensable vapor from a gas flow, and the additional challenges imposed by microgravity.

SUMMARY

One aspect of the present disclosure relates to a liquid/gas phase separator that uses, for example, capillary geometry, momentum vector change, temperature, and/or condensation as a basis for separate phases from a liquid/gas mixture, or from a gas stream containing condensable vapor. Additionally, the present devices and related methods are designed to have improved manufacturability compared to other capillary phase separation devices. In some examples, the phase separator device may be made using traditional machining method and does not require additive manufacturing to create the needed capillary geometry.

Another aspect relates to an apparatus to separate liquid from a liquid/gas mixture in a low gravity environment. The apparatus includes a chamber having a capillary channel around a perimeter of the chamber, a liquid/gas inlet to the chamber, a liquid outlet from the chamber, the liquid outlet being positioned at the perimeter of the chamber to remove liquid from the capillary channel, and a gas outlet from the chamber. The gas outlet is positioned away from the perimeter in the chamber to remove gas from the chamber.

At least one of the liquid/gas mixture, the liquid, and the gas may be provided under ambient pressure of the low gravity environment, and the others of the liquid/gas mixture, the liquid, and the gas may be provided under pressure conditions that are increased or decreased relative to ambient pressure of the low gravity environment. The liquid/gas mixture may be pumped into the chamber, and the liquid may be pumped out of the chamber. The liquid/gas inlet may be positioned on an opposite side of the chamber from the liquid outlet. The chamber may have a disc shape. The apparatus may further include a controller and at least one sensor, wherein the at least one sensor may detect liquid at the liquid outlet and generate a sensor signal, and the controller may control flow of liquid out of the liquid outlet based on the sensor signal. The apparatus may further include a cooling device operable to reduce a temperature of a portion of the apparatus that defines the chamber to condense vapors and control a humidity or dew point of the gas leaving the chamber. The apparatus may further include at least one pressure sensor to determine a pressure condition in the liquid/gas inlet. The apparatus may further include at least one surface feature provided in a surface exposed within the chamber, the at least one surface feature to limit bubble formation within the chamber.

A further aspect of the present disclosure relates to an apparatus to separate liquid from a liquid/gas stream. The apparatus includes a first housing member, a second housing member, a chamber defined between the first and second housing members, a channel extending around at least a portion of a perimeter of the chamber, an inlet to receive the liquid/gas stream into the chamber, a liquid outlet positioned at the perimeter of the chamber, a gas outlet positioned away from the perimeter of the chamber, and a controller operable to control flow of liquid out of the liquid outlet in response a volume of liquid being detected in the chamber.

The controller may be operable to control flow of the liquid/gas stream into the chamber in response to at least one of the flow of liquid out of the liquid outlet being detected or the volume of liquid being detected in the chamber. The first or second housing member may include at least one surface feature exposed within the chamber, and the at least one surface feature may limit bubble formation within the chamber. The inlet, liquid outlet, and gas outlet may be formed in the first housing member, the second housing member, or a combination of the first and second housing members. The first housing member may have a clam shaped portion, and the second housing member has a planar or contoured portion. The first housing member may include a thermally insulative material, and the second housing member may include a thermally conductive material.

Another aspect of the present disclosure relates to a method of removing liquid from a liquid/gas stream. The method may include providing a separation device having a chamber, an inlet, a liquid outlet, and a gas outlet, flowing the liquid/gas stream into the chamber through the inlet, flowing the liquid/gas stream along a channel in the chamber to separate liquid from gas in the liquid/gas stream, detecting a volume of liquid in the chamber at the liquid outlet, pumping the volume of liquid out of the chamber through the liquid outlet, and permitting the gas to flow out of the gas outlet.

The method may further include stopping the pumping of the volume of liquid if gas is detected at the liquid outlet or in a liquid outlet line coupled to the liquid outlet. Separating the liquid from the gas may include popping bubbles in the chamber using at least one surface features positioned in the chamber. The method may include providing a control system to control pumping of the liquid/gas stream and the volume of liquid. The separation device may include at least one sensor configured to detect the volume of liquid and generate a sensor signal, and the control system may be operable to control pumping of the volume of liquid out of the chamber after the sensor signal indicates that sufficient liquid is present at the liquid outlet.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
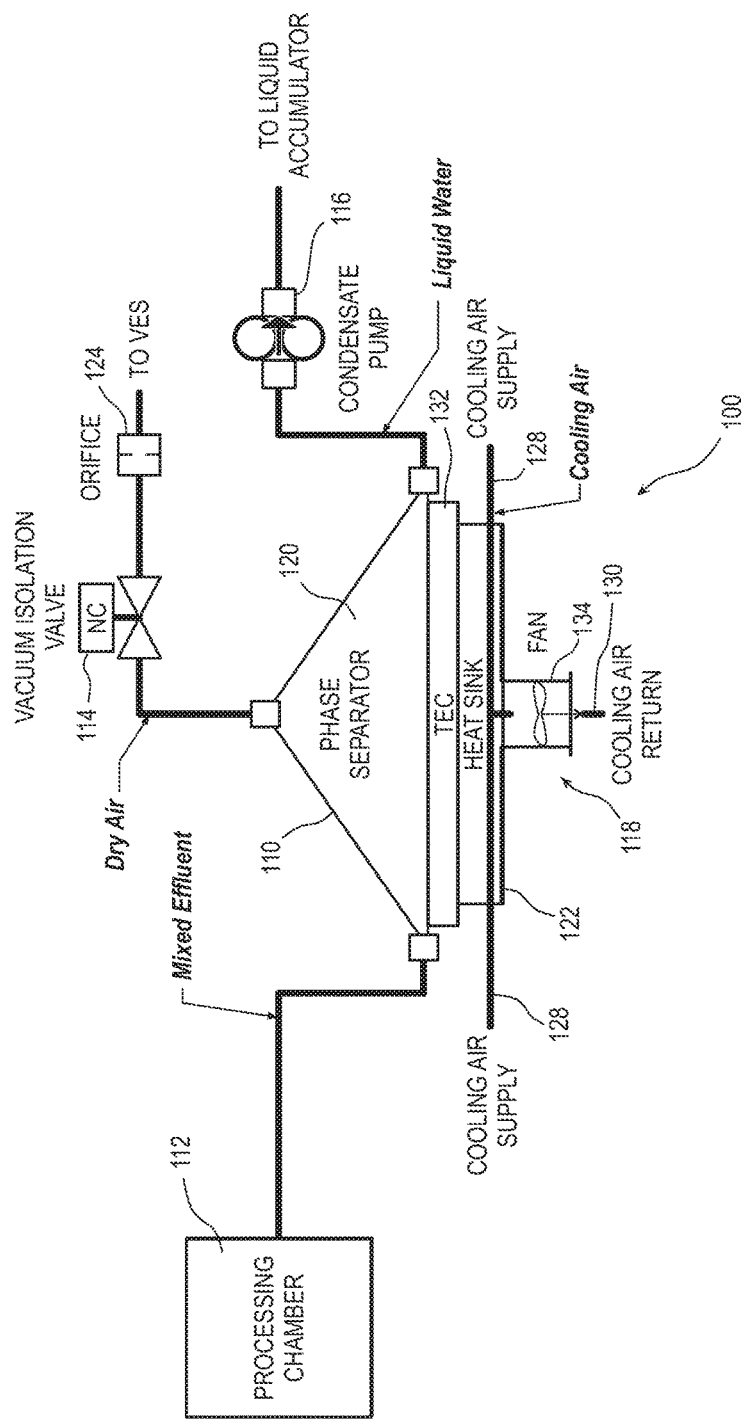
FIG. 1 shows an example phase separator system in accordance with the present disclosure period

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Some space systems require separation of mixtures into liquid and gas phases. Recovery of water and other liquids to "close the loop" for life support systems in space is often a goal. The present disclosure may be applicable to microgravity systems that require this functionality. Some example applications include a trash compaction and processing system (TCPS), plant growth payloads where there is a need to be able to separate liquid and gas recovered from the root zone, recover humidity from transpiration of plants, etc., and other systems that deal with environments where gas and liquid which may become mixed.

The systems and methods of the present disclosure may be operable to, among other things, separate liquid and gas phases, condense water vapor into liquid water, or both the separating and condensing functions. The systems and methods disclosed herein may combine capillary phase separation geometry with features of a condensing heat exchanger. At least portion of the system may be manufactured using 3-axis machining, injection molding, or other traditional manufacturing methods. Other types of capillary phase separators typically require additive manufacturing (i.e., 3D printing) to construct their specialized geometry, which limits the materials from which such phase separators can be constructed.

The phase separator device can address the shortcomings of existing separator devices made using additive manufacturing by forming the capillary geometry of the separator device as a two-part housing or shell. One part of the housing has a pocket or recess (also referred to as a clam-shaped or concave structure) which follows a specialized contour. This first housing member, when joined against a second housing member having a flat or convex shape, results in a capillary wedge, channel or cavity in the interior corner between the two parts. The second housing member may include a thermally conductive portion and may include features for heat exchange. The second housing member may act as a condensing heat exchanger upon which water vapor condenses into liquid. The first housing member may also act as a condensing heat exchanger if it is fabricated from a thermally conductive material.

Another challenge addressed by the system of the present disclosure relates to separating liquid and gas phases in a microgravity environment. The present disclosure provides a device with an interior volume having an effluent inlet (also referred to as a liquid/gas mixture inlet), an interior corner forming a capillary wedge or channel, a liquid outlet, and a gas outlet. The mixed-phase effluent enters from the inlet near a corner of the capillary wedge. The inlet may be oriented tangentially or nearly-tangential to the capillary channel. The capillary wedge may have a variable angle interior corner to promote capillary flow in a direction from the inlet to the liquid outlet. The interior volume of the device may include features to mitigate growth of bubbles near the inlet, thereby improving gas separation efficiency. The gas outlet may include features such as a "stovepipe" to prevent liquid from passing through the gas outlet.

A further challenge addressed by the system of the present disclosure relates to condensing water vapor to liquid, and separating this liquid from gas flow, particularly in a microgravity environment. The housing members of the separator device may act as a condensing heat exchanger. The heat exchanger may include thermoelectric coolers, air cooling, and/or liquid cooling to reduce the temperature of the heat exchanger to a desired dew point for the outlet gas. Because the surface area to volume ratio of the internal volume increases where the capillary wedge narrows, the temperature may be lowest in the corner of the channel. Thus liquid more likely will condense within the channel. This synergizes with the capillary separation, as the capillary forces also drive liquid to the corner of the channel, while gas moves away from the corner.

The present disclosure provides for increased flexibility of manufacturing options and material selections for the capillary separation geometry due to the unique geometries and construction for the separator device. The combination of capillary phase separation of gas and liquid and separation of water vapor from gas flow via condensing heat exchange may also provide certain advantages. The disclosed systems and method may provide improved ability to separate water from effluent, regardless if water is in liquid phase or vapor phase, and may provide the ability to function over a range of pressures, ranging from sub-atmospheric to above atmospheric.

In a general sense, the invention may include an inlet, a gas outlet, a liquid outlet, a phase separator, and a heat exchanger. The inlet may provide gas/liquid flow, or gas with condensable vapors. The inlet flow may come from a batch process, such as TCPS with its processing chamber, or be a continuous process, such as an atmospheric humidity control system. The inlet flow, in at least some arrangements, may be set by an external system or process. The gas outlet provides gas removal that is either actively or passively controlled. The gas outlet may include a "stove pipe" interface to prevent liquid from spilling over into the gas outlet. The liquid outlet may also be actively or passively controlled. Active or passive control of the gas and liquid outlets depends on, for example, what separation efficiency is needed, and how well defined the inlet flow is. If the inlet flow is well defined, the outlets can be set to drain at specified rates without feedback. If inlet conditions are poorly defined or variable, active control and feedback are more likely required to achieve desired separation efficiencies.

The phase separator may include two housing members that join together to form a capillary channel. At least one housing member may include a specialized contour to establish the capillary geometry at the joint. The phase separator may include specialized geometry for limiting bubble growth. The geometry may include pinning edges (i.e., a sharp edge that interrupts a continuous smooth surface and which "pins" an advancing meniscus) in the path between the inlet and the gas outlet. The heat exchanger may be incorporated into the first housing member, second housing member, or both. The heat exchanger may utilize a variety of cooling methods, including but not limited to: air cooling (including cooling air supply, fan(s), and cooling air return), liquid cooling (including cooling liquid supply and cooling liquid return), thermoelectric cooling, phase-change materials, radiative cooling, or combination of any of the above. Various cooling methods may be integrated directly into the housing members, or may be separate. The heat exchanger may include sensors for temperature control feedback. The sensors may include temperature sensors within the heat exchange surfaces, temperature sensors for the gas and liquid outlet, and/or humidity/dew point sensors for the gas outlet.

Other aspects of the present disclosure relate to outlet flow control and liquid/gas detection. Outlet flow control may include aspects of controlling the flow rate of gas and/or liquid leaving the phase separator, and may include pumps, valves, orifices, etc., as well as active or passive control, depending on the needs of the systems with which it interfaces. Liquid/gas detection may include sensor(s) which can determine whether gas or liquid is present at one or more locations. The sensors may measure what is actually inside the phase separator, or monitor whether gas or liquid is in the inlet or outlet lines. Data from these sensors may be used for advanced control algorithms, such as determining aspects of limiting wear and tear on pumps, valves, etc, or automatic correction if gas enters the liquid outlet, or vice versa.

FIG. 1 shows an example phase separator system 100. The system 100 is an example of a capillary phase separation, Direct-to-VES (Vacuum Exhaust System; also referred to as a "spacecraft vent system") type system. The system 100 generally includes a relatively simple system architecture that may be subject to VES scheduling restrictions in a spacecraft. The system 100 may provide separation of liquid already present and vapor condensation directly into the phase separator. Thermo electric coolers (TECs) may be required to lower the temperature of the gases in order for the condensing to occur. Liquid is drained from the separator to maintain capillary stability. Gas is vented directly to the spacecraft vent system. The system 100 may be particularly useful in low or microgravity environments, and may be referred to as a microgravity phase separator system.

The system 100 includes a phase separator having at least one processing chamber 112 (also referred to as a source of two phase flow 112, or a mixed gas/liquid source 112 or a liquid/gas supply 112), a gas isolation valve 114, a condensate pump 116, a cooling system 118, and a chamber 120. An orifice 124 is associated with gas isolation valve 114 for limiting the gas flow rate entering the VES. The cooling system 118 may include a heat sink 122, a cooling air supply 128, a return 130, a thermo electric cooler(s) (TEC) 132, and a fan(s) 134. The cooling system may also use a liquid cooling loop in place of cooling air and fan.

In operation, a flow of liquid/gas is directed from the mixed gas/liquid source 112 to an inlet of the phase separator 110. The liquid and gas are separated from each other within the chamber 120. Additional liquid may be removed from the gas via condensation within the chamber 120 using, for example, the condensate pump 116, and the removed liquid is directed to a liquid accumulator. Generally, the cooling system condenses liquid out of the gas, thus creating more liquid and a drier gas. The liquid, whether it came into the chamber as liquid, or if it was condensed out of the gas by the cooling system, is then removed from the device with the condensate pump 116. The separated gas is withdrawn from the chamber 120 by control of a gas isolation valve 114, and the orifice 124 controls flow to a vacuum source, such as a spacecraft vent system. Any condensable vapor within the gas in chamber 120 may be condensed via the TEC 132 and other features of the cooling system 118 before removal of the gas from chamber 120.

A capillary structure may be defined within the chamber 120 to assist with separation of the liquid and gas phase. The phase separator 110 may include features that eliminate or reduce the incidence of gas bubbles. The system 100 may include additional pumps, such as a pump that draws the flow of liquid/gas mixture from the mixed gas/liquid source 112 and into the chamber 120 of the phase separator 110. Other pumps may include a pump that draws the gas from chamber 120 in addition to or in place of one or more of the condensate pump 116 and pumps associated with the liquid/gas flow from mixed gas/liquid source 112.

Figure 2:
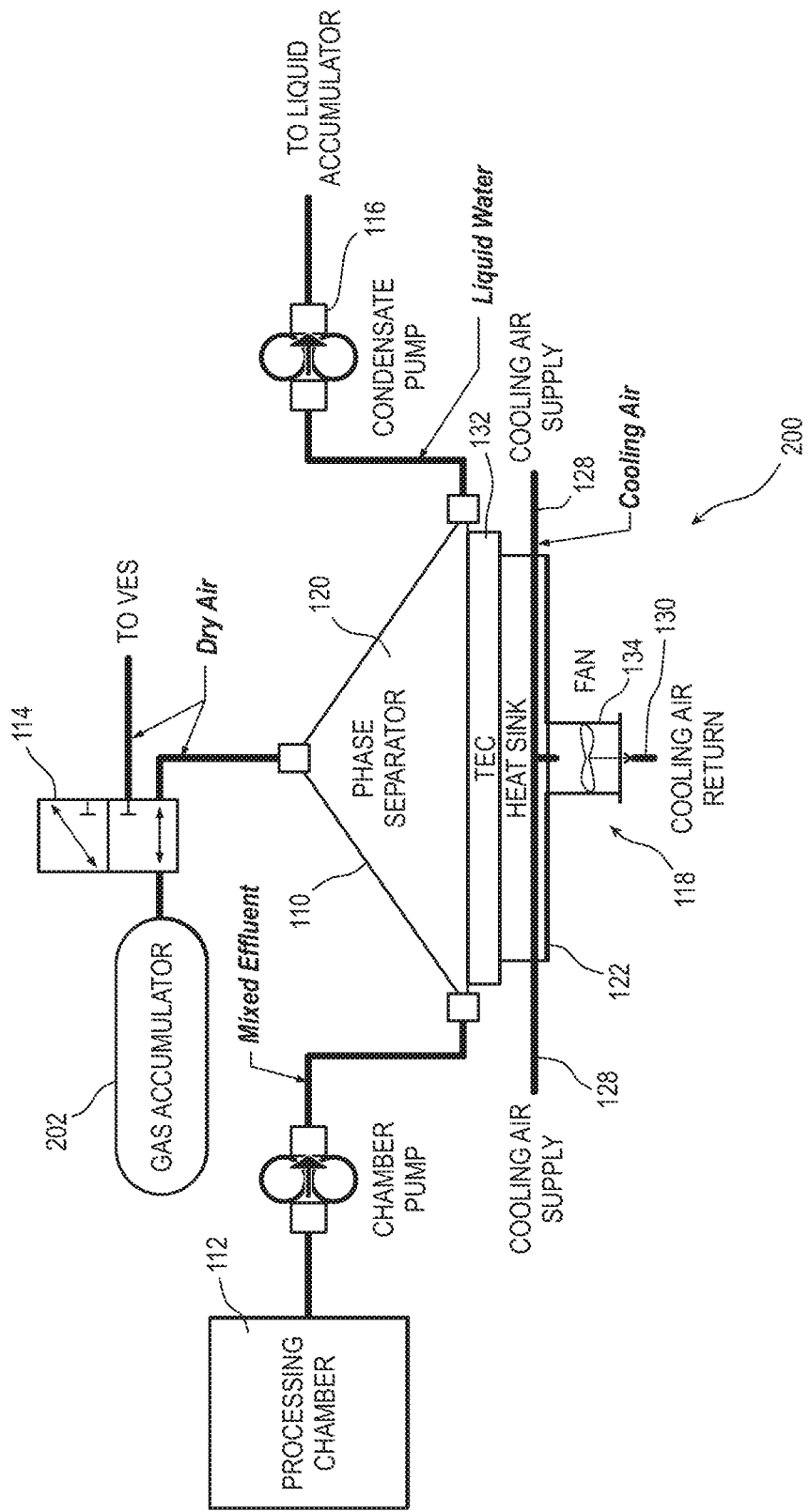
FIG. 2 shows another example phase separator system in accordance with the present disclosure.

FIG. 2 shows another example phase separator system 200, which may include some of the same or similar features of the system 100 show in in FIG. 1. The system 200 may be referred to as a capillary phase separation system. The system 200 may provide for water condensation upstream of the phase separator. One or more TECs may be used to lower the dew point of gases collected in the chamber of the phase separator. Liquid may be drained from the chamber to maintain capillary stability. Gas removed from the chamber of the phase separator may be stored in an accumulator for spacecraft venting or gas processing. The use of a chamber pump and an accumulator may permit operational flexibility for the system 200 compared to system 100.

The system 200 is shown including a phase separator 110, a mixed gas/liquid source 112, a gas isolation valve 114, an orifice 124, a condensate pump 116, a cooling system 118, and a chamber 120. The cooling system includes a supply 128, returns 130, TEC(s) 132, and a fan(s) 134. A chamber pump may control flow of the liquid/gas mixture from the mixed gas/liquid source 112 to an inlet of the phase separator 110. A gas accumulator 202 may be in flow communication with the valve 114 and used to store gas collected from the phase separator. The gas stored in accumulator may be released to the spacecraft vent or directed to another system or device for further processing. The system 200 may include other features and functionality such as, for example, a pump that removes gas from the phase separator 110 that is used in addition to or in place of one of the condensate pump 116 and chamber pump 204.

Figure 3:
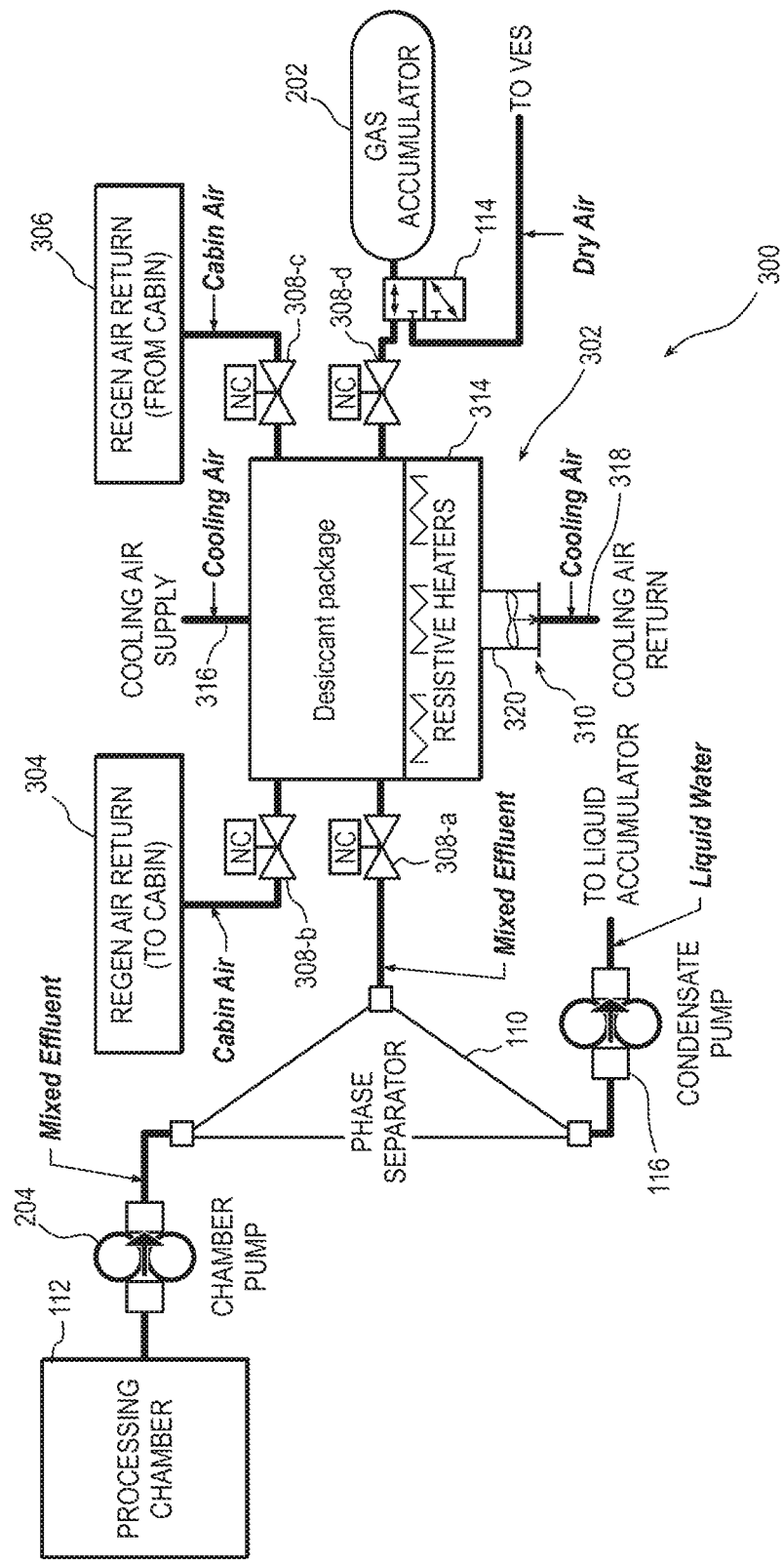
FIG. 3 shows another example phase separator system in accordance with the present disclosure.

FIG. 3 shows another example phase separator system 300 that includes many of the same or similar features as the systems 100, 200 described above. The system 300 may be referred to as a capillary and desiccant hybrid system. The system 300 may provide for water condensation upstream of a phase separator. Liquid may be removed by capillary separation. Residual water vapor may be removed by desiccant. The desiccant may be regenerable. In one example, a single bed desiccant configuration may be less than 10 grams and 20 milliliters of capacity. Regeneration may occur, for example, after trash processing within the processing chamber. The system 300 may be operational without TECs. The system 300 may provide reduced quantities of desiccant compared to desiccant-only systems. The system 300 may be relatively more complex than other systems disclosed herein. A cabin air interface and additional power may be needed in order to operate the system 300 as compared to other systems disclosed herein.

The system 300 includes a phase separator 110, a mixed gas/liquid source 112, a gas isolation valve 114, a condensate pump 116, a chamber pump 204, and a desiccant package 302. The desiccant package 302 includes regeneration air return to cabin 304, regeneration air supply from cabin 306, a plurality of valves 308-a-d, a cooling supply 310, resistive heaters 314, cooling air supply 316, and cooling air return 318. Gas removed from the phase separator 110 may be directed to the desiccant package 302 for processing of the gas. The processed gas may be directed through the valve 114 to a gas accumulator and/or to the spacecraft vent.

The desiccant water removal via the desiccant package 302 may provide desiccant adsorption of water vapor. The desiccant configurations may include a single bed configuration with specifications of, for example, 3.2 kilograms and 7.3 liters, or a two-bed swing bed configuration having parameters of, for example, 0.5 kilograms and 1.2 liters. The water vapor may be rejected to cabin air. Gas stored in the accumulator 202 may be directed to the spacecraft vent or gas processing. The desiccant package 302 may provide for relatively low dew point operation. In some examples, the desiccant package 302 may result in exceeded cabin air latent heat load limits depending on waste composition.

Figure 4:
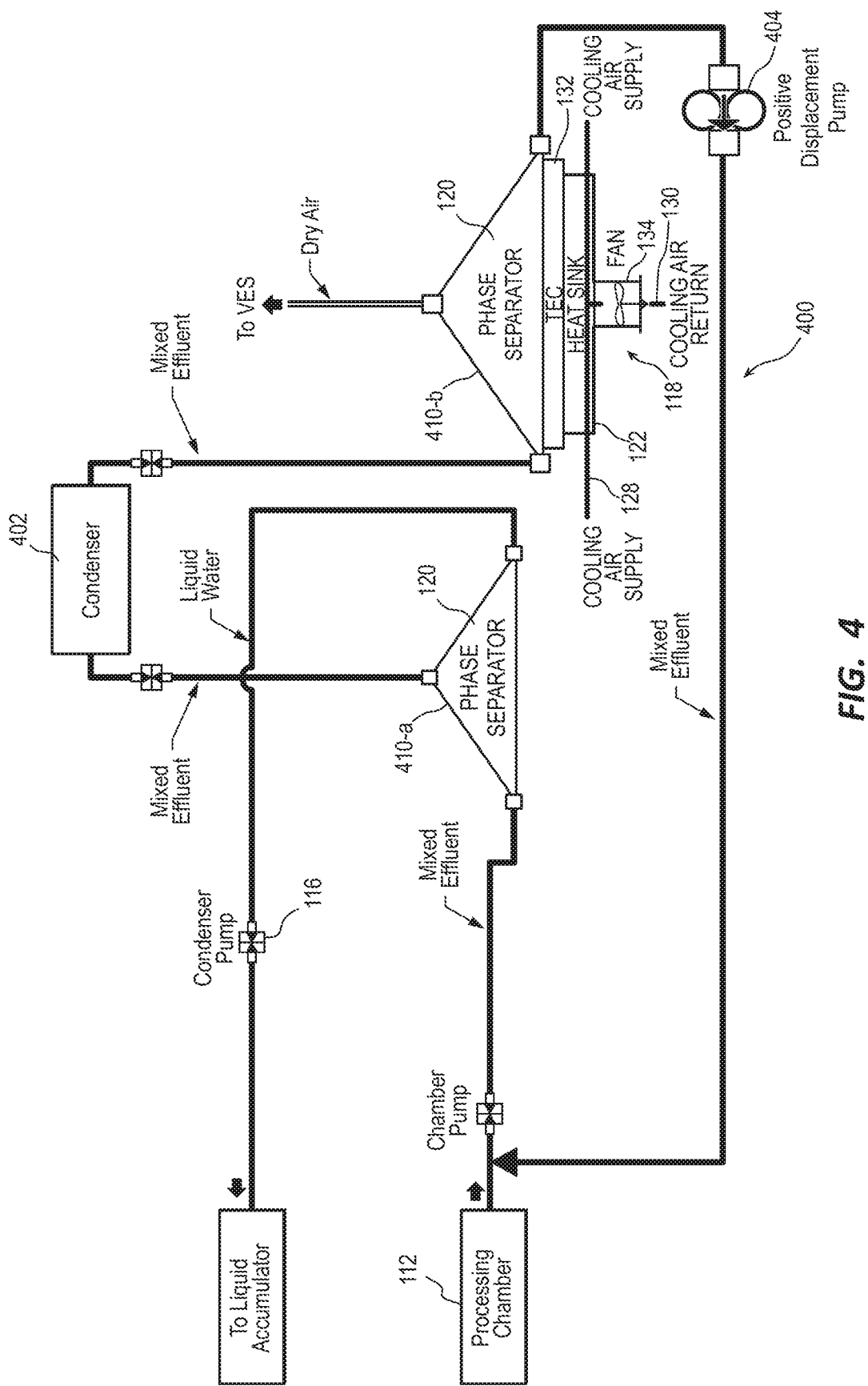
FIG. 4 shows another example phase separator system in accordance with the present disclosure.

FIG. 4 shows another example phase separator system 400 that includes many of the same or similar features as the systems 100, 200, 300 described above. The system 400 includes first and second phase separators 410-a, 410-b that are arranged to each be a backup for the other with complementary separation functions.

The first phase separator 410-a is set up to maximize liquid separation efficiency. The gas outlet of the first phase separator 410-a may contain a mixture of gas and liquid, and is provided as a mixed phase flow into the inlet of the second phase separator 410-b. The second phase separator 410-b is set up to maximize gas separation efficiency. The liquid outlet of the second phase separator 410-b is expected to include a mixture of gas and liquid, and is provide back into the mixed flow that is in the inlet line to the first phase separator 410-a.

The first phase separator 410-a may be referred to as a primary phase separator, and is optimized to separate liquid from a stream of mixed phase flow. The first phase separator 410-a receives a mixed effluent from a processing chamber 112 or other mixed phase flow source. The liquid level in the internal chamber 120 is allowed to go higher than may typically be done if using only a single phase separator in a system. This will create a high chance that liquid flows out of the gas outlet of the first phase separator 410-a while reducing the risk that gas will flow out of the liquid outlet, especially during a disturbance to the system, such as in the case of use in a microgravity environment when an astronaut inadvertently contacts the phase separator or the spacecraft accelerates. The gas outlet of the first phase separator 410-a, which has a higher chance of containing liquid, is ported to the inlet of the second phase separator 410-b where the liquid is constantly drained, thereby providing a higher likelihood that no liquid will escape through the gas outlet of the second phase separator 410-b. The gas outlet of the first phase separator 410-a may be coupled to a condenser 402 to condense additional vapor from the gas in the mixture before arriving at the inlet of the second phase separator 410-b. In this way, the second phase separator 4100b is a backup or secondary protection against liquid entering the final system gas outlet where it could damage downstream gas processing systems.

The second phase separator 410-b may be referred to as a secondary phase separator, and is optimized to remove gas from a mixed phase flow. The liquid level in the chamber 120 of the second phase separator 410-b is intentionally kept as low as possible, but with a high likelihood of drawing gas into the liquid outlet. The liquid outlet of the second phase separator 410-b, which as a high likelihood of containing gas, is fed back to the inlet of the first phase separator 410-a via a constantly running positive displacement pump 404. This recirculation ensures that any liquid that escaped the first phase separator initially can be recaptured. In this arrangement for system 400, each of the first and second phase separators 410-a, 410-b serves as a backup to the other, providing redundant separation operation and overall improvement to separation reliability for the system 400.

Figure 5:
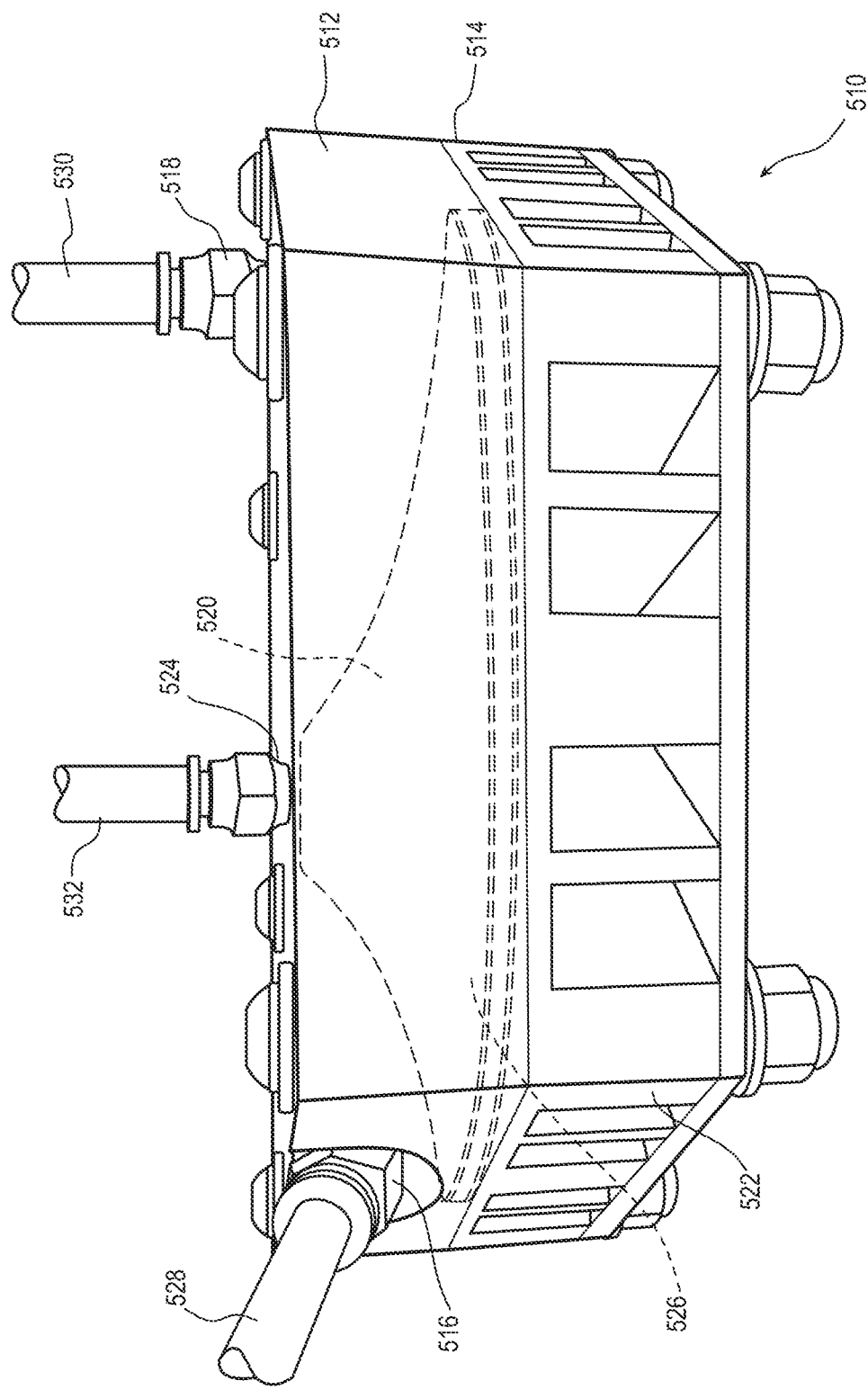
FIG. 5 is a perspective view of an example phase separator in accordance with the present disclosure.

FIG. 5 shows an example of a phase separator for use in the phase separator systems disclosed herein. The phase separator 410 show in FIG. 5 may include a first housing 512, a second housing 514, a chamber 520, an inlet 516, a liquid outlet 518, a gas outlet 524, a heat sink 522, and a channel 526. The first housing 512 may define a cavity or pocket that includes a specialized contour, which when joined against the second housing 514 creates a capillary wedge or channel 526 between the first and second housings 512, 514.

The gas outlet 524 may be positioned centrally in the pocket or chamber 520. The inlet 516 and liquid outlet 518 may be positioned along the channel 526 at a periphery of the chamber 520. The channel 426 may form a variable angle interior corner. An example of such a variable angle corner is described in more detail below with reference to FIG. 9. The internal shapes of the first and second housing members are set to form the shape of the cavity between them. At least one of the first and second housing members may be contoured (i.e., clam shaped), and the other can be planar, which simplifies manufacture of that component having the planar surface. However, the other could also be contoured, convex or concave, as long as the volume left between the two housing members still establishes a cavity with the appropriate internal corner angle around the perimeter.

The second housing 514 may have a relatively flat or planer surface, at least at the interface between the first and second housings 512, 514 to define the wedge or channel 526. In other arrangements, the surface of the second housing 514 that faces the first housing 512 may include a protrusion or convex or contoured shape that extends into the chamber 520. The shape of the second housing 514 may influence the shape, size and orientation of the wedge or channel at the 526 at the interface between the first and second housings 512, 514.

The second housing 514 may comprise a thermally conductive material. The first housing 512 may or may not include thermally conductive material. The geometry of the both housings are suitable for a variety of materials, including polymers, metals, ceramics, and composites. In at least one example, the first housing 512 comprises a polymeric material with low thermal conductivity such as polycarbonate, PTFE, Ultem, or Noryl. The second housing 514 may comprise any one of a variety of thermally conductive materials or non-conductive materials. Some examples of thermally conductive materials include, for example, aluminum, copper, silver, or stainless steel. When thermally conductive materials are used for either or both housings, they provide a condensing heat exchanger function. This may provide for condensing of water vapor into liquids upon contact of the water vapor with the first housing 412 or the second housing 514.

Figure 6:
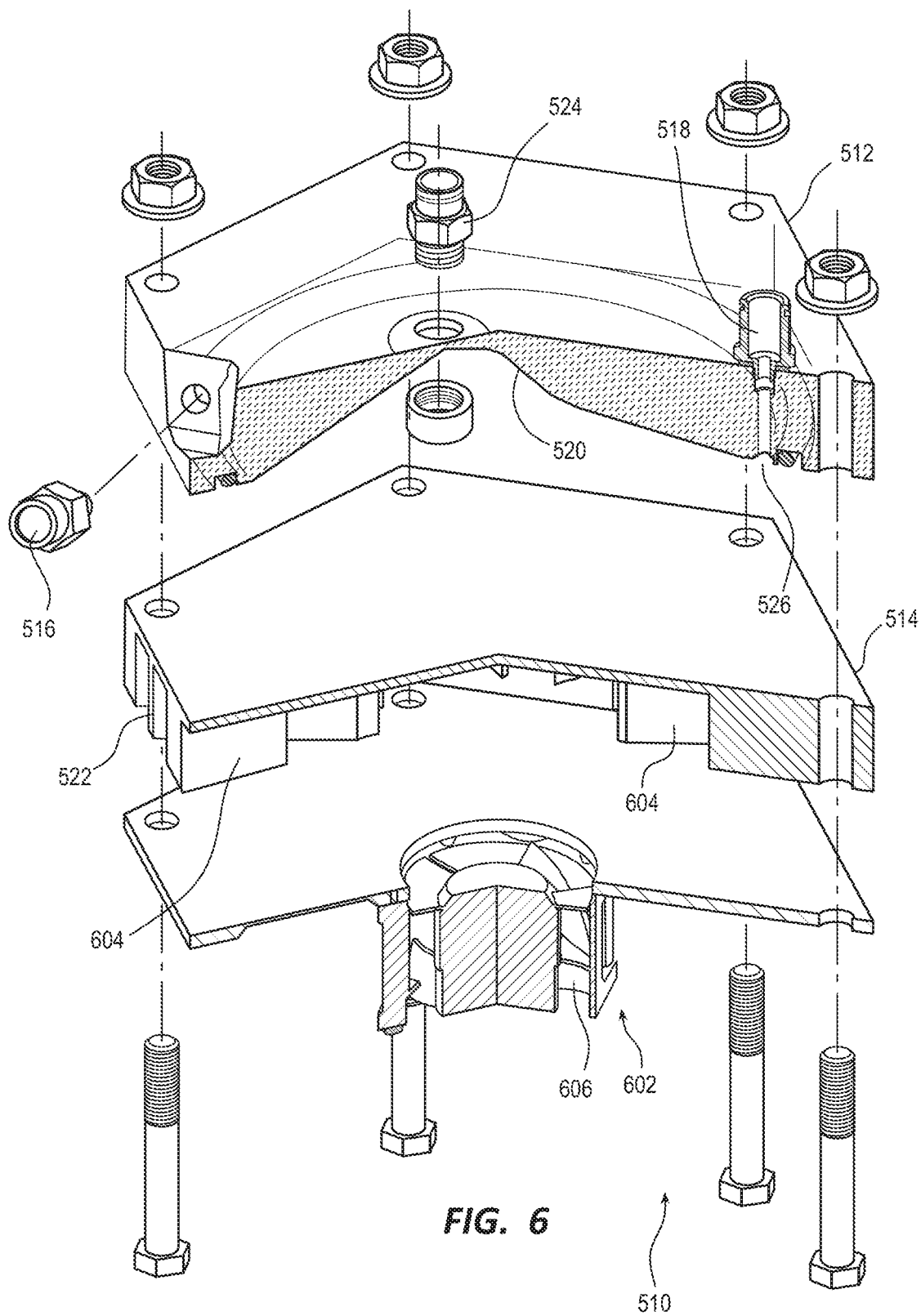
FIG. 6 is an exploded perspective view of the phase separator show in in FIG. 5.
Figure 7:
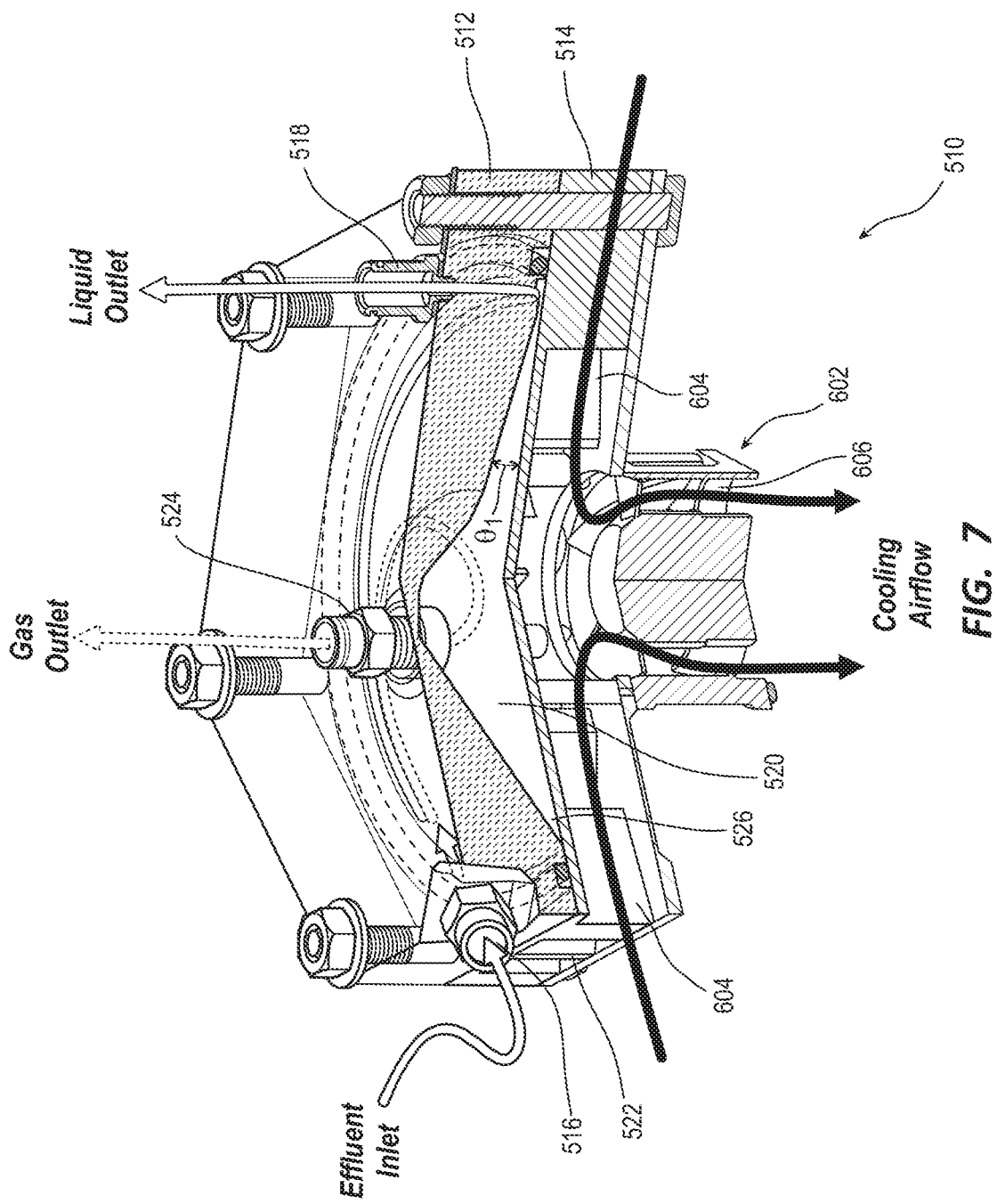
FIG. 7 is a partial cross-sectional view of the phase separator shown in FIG. 5.

FIGS. 6 and 7 illustrate additional features of the phase separator 510, such as, for example, the shape and size of the interiors of first and second housings 512, 514, the flow path for the liquid/gas mixture, the liquid flow path, and the gas flow path, and a flow path for the supply 604 and return 606 of the cooling system 602 shown in FIG. 7.

In operation, the mixed phase flow, also referred to as a liquid/gas mixture, enters from the inlet 516 near a corner of the capillary wedge or channel 526. The inlet 516 may be oriented tangentially or nearly tangential to the capillary channel 526. The channel 526 may have a variable angle interior corner to promote capillary flow in a direction from the inlet 516 to the liquid outlet 518. The angle may be determined by the contact angle between the liquid and the housing materials. The angle may be set to satisfy the Concus-Finn condition to establish capillary flow within at least some portion of the interior corner. This condition is $\theta < \pi/2 - \alpha$, where $\theta$ is the equilibrium contact angle between the housing material, and $\alpha$ is the interior corner half-angle (total included angle of the interior corner=$2\alpha$). See Concus, P., Finn, R., "On the Behavior of a Capillary Surface in a Wedge," Proceedings of the National Academy of Sciences of the United States of America, Vol. 63, No2, 1969, pp. 292-299. Decreasing the angle as it approaches the liquid outlet 418 ensures capillary flow toward the outlet. Example of a variable angle internal corner is shown and described in further detail below with reference to FIG. 9.

The interior volume of the chamber 520 may include features to mitigate growth of bubbles, such as bubbles near the inlet 516, to improve gas separation efficiency. The gas outlet 524 include features such as a stove pipe structure to assist in preventing liquid from passing through the gas outlet 524 instead of passing solely through the liquid outlet 518.

The phase separator 510 may be effective at condensing water vapor to liquid, and separating this liquid from the gas flow within chamber 520. The second housing 514 may function as a condensing heat exchanger. The second housing 514 may include thermoelectric coolers (e.g., TECs 132 show in in FIGS. 1-4), air cooling (e.g., FIG. 5), and/or liquid cooling, to reduce the temperature of the heat exchanger to a desired dew point for the outlet gas. A surface area to volume ratio of the internal chamber 520 is increased where the capillary channel 526 narrows, the temperature will be lowest in the corners of the channel 526, and thus liquid will preferentially condense within the channel 526. This synergizes with the capillary separation, as the capillary forces also drive liquid to the corner of the channel 526 while gas moves away from the corner towards the gas outlet 524.

The separation of liquid and gas within the chamber 520 due to the operation of the phase separator 510 may be effective in a variety of different pressure conditions ranging from, for example, below atmospheric pressure conditions to above atmospheric pressure conditions, and including microgravity environments.

Figure 8:
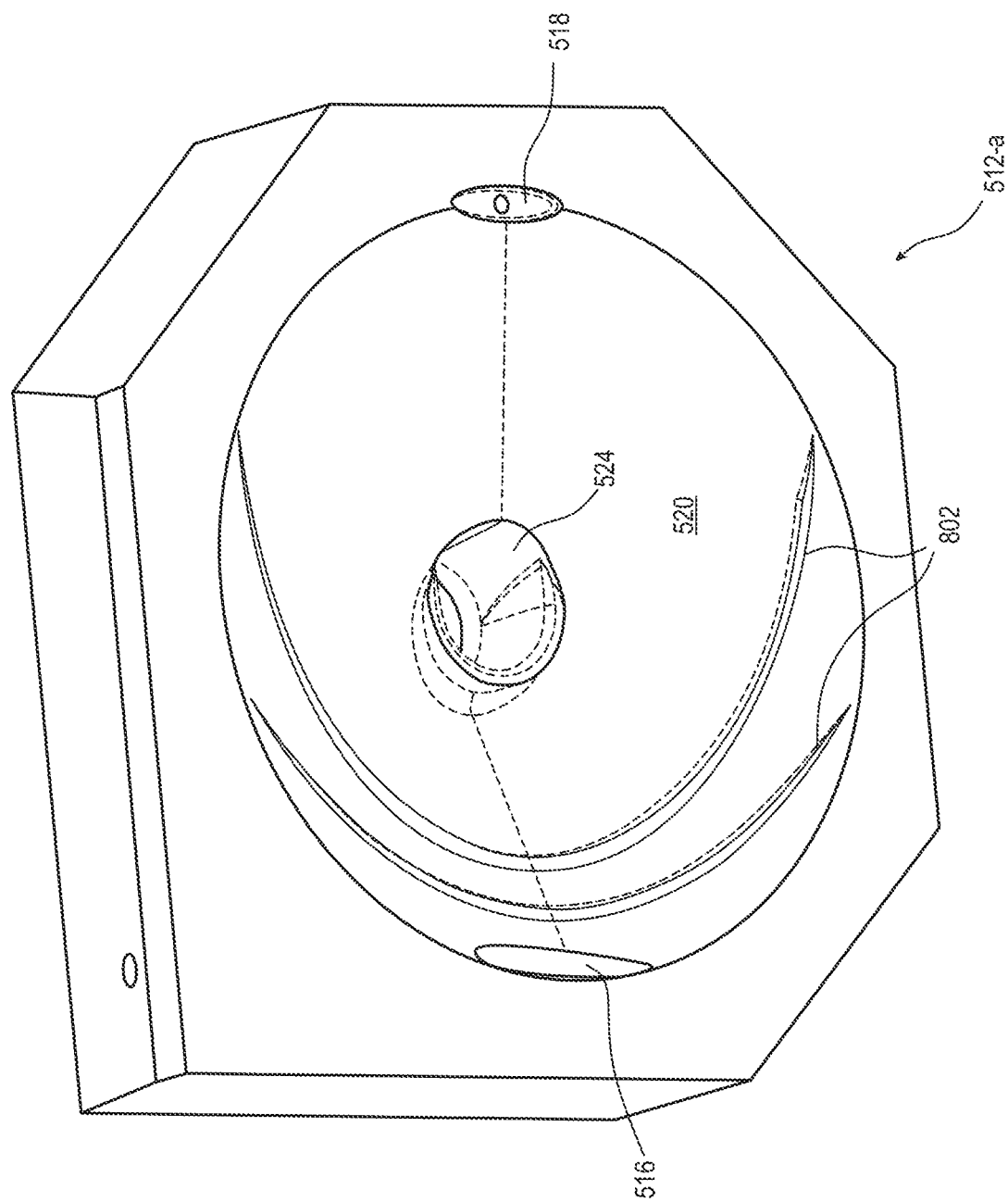
FIG. 8 is a bottom perspective view of a first housing member of another example phase separator in accordance with the present disclosure.

FIG. 8 illustrates another example of first housing 512-$a$ that includes one or more pinning edges 802 arranged a surface of the housing 512-$a$ that is exposed within the chamber 520. Alternatively, or additionally, the one or more pinning edges 802 may be positioned on the second housing 514. The pinning edges 802 may engaged with bubbles that are formed within the chamber 520. The pinning edges limit the growth of bubbles from the inlet 516, causing them to pop before reaching the gas outlet 524. This prevents the liquid in the bubble membrane from leaving through outlet 524. In at some examples, the pinning edges 802 are sized, shaped and arranged to burst the bubbles independent of the location of the bubbles within the chamber 520.

The pinning edges 802 may be described as being or having a contoured shape along their length. The pinning edges 802 may have a groove or recess-type structure. The pinning edges 802 may have a protrusion or protruding-type shape, such as a sharp edge or one or more pointed structures that assist in limiting bubble growth. The pinning edges 802 may extend adjacent to the inlet 516 as show in FIG. 8. Alternatively, portions of the pinning edges 702 may extend adjacent the liquid outlet 518 and/or gas outlet 524. In arrangements where there are more than one pinning edge 702, portions of the pinning edges may be arranged in parallel with each other, whereas other portions of the pinning edges may extend at an angle relative to each other, such as at converging or diverging arrangements relative to each other.

Figure 9:
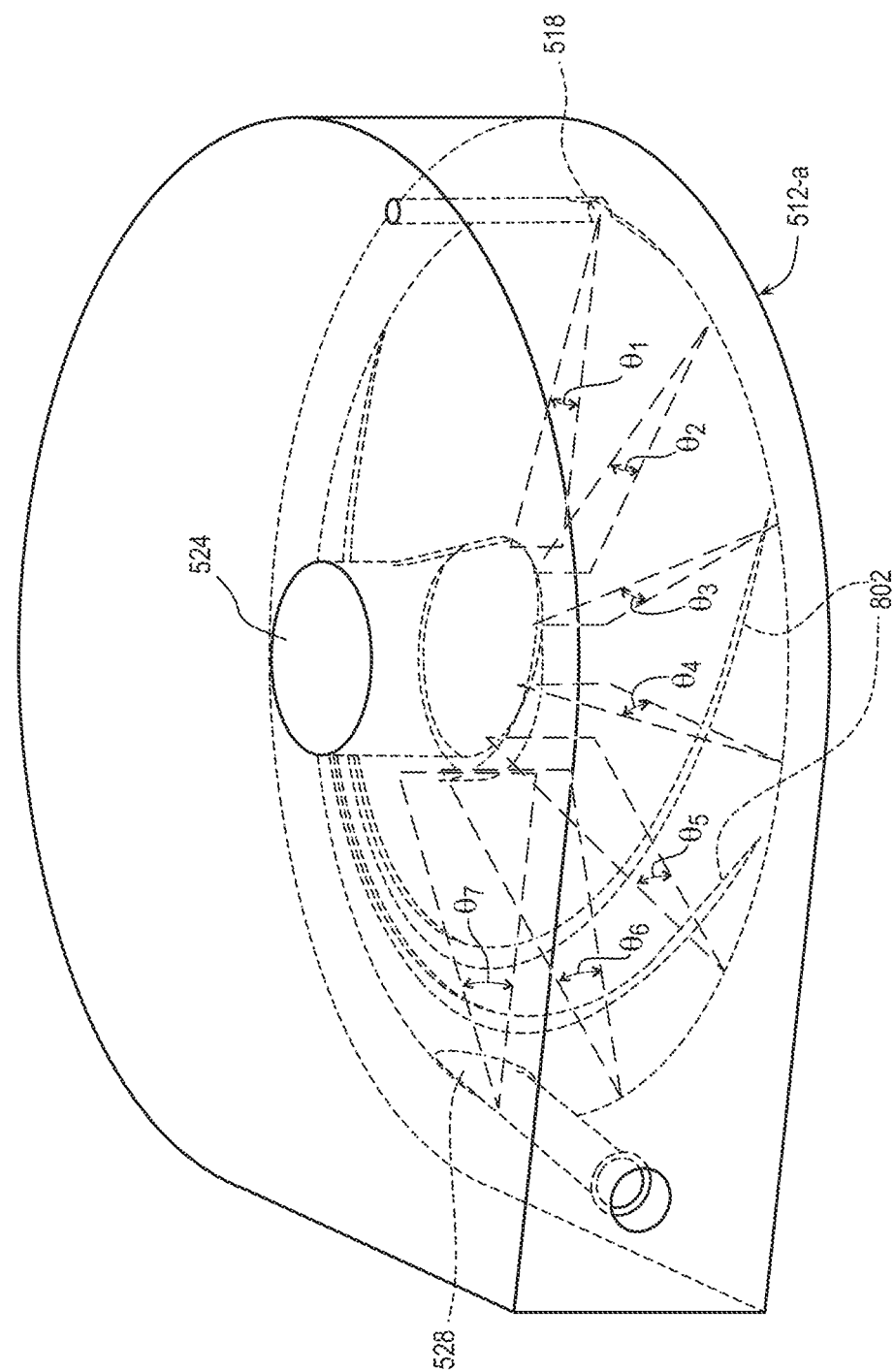
FIG. 9 is a top perspective view of the first housing member shown in FIG. 8 and identifying a variable angled surface within the separator chamber.

FIG. 9 shows a top perspective view of the first housing 512-$a$ with a plurality of angle indicators $\theta_{1-7}$ representing the change in shape along the inner surface defining chamber 520. The angles $\theta_{1-7}$ typically are increasing from the liquid outlet 518 to the inlet 528. On an opposite side of the chamber 520, the angles of the same surface of the first housing 512-*a* from the inlet 528 to the outlet 518 may be decreasing. In at least one example, the shape of the angled surface is mirrored about a center plane extending from the inlet 528 to the outlet 518.

The angles $\theta_{1-7}$ typically may be in the range of about 5° to about 50° degrees, and more particularly about 10° to about 25°. The values for angles show in FIG. 9 are as follows: $\theta_1$ about 10°, $\theta_2$ about 11°, $\theta_3$ about 14°, $\theta_4$ about 17°, $\theta_5$ about 20°, $\theta_6$ about 23°, and $\theta_7$ about 25°.

The angles shown in FIG. 9 are about $2\alpha$, where $\alpha$ is the interior corner half-angle, per the Concus-Finn condition. Furthermore, $$\theta = \frac{\pi}{2} - \alpha \qquad \text{Equation 1}$$

Where:

$\theta$ is the equilibrium contact angle between the housing material

The largest $\alpha$ in the example represented in FIG. 9 is 12.5°, so this shape for the first housing 512-*a* will demonstrate capillary flow around the entire channel from the inlet 528 to the liquid outlet 518 as long as $\theta$<77.5°. Other shapes and sizes are possible for the interior surface of the first housing member 512-*a* that result in different angles, or the combination of the shapes of the first housing member and second housing member exposed within the internal chamber may result in a different set of angles.

Figure 10:
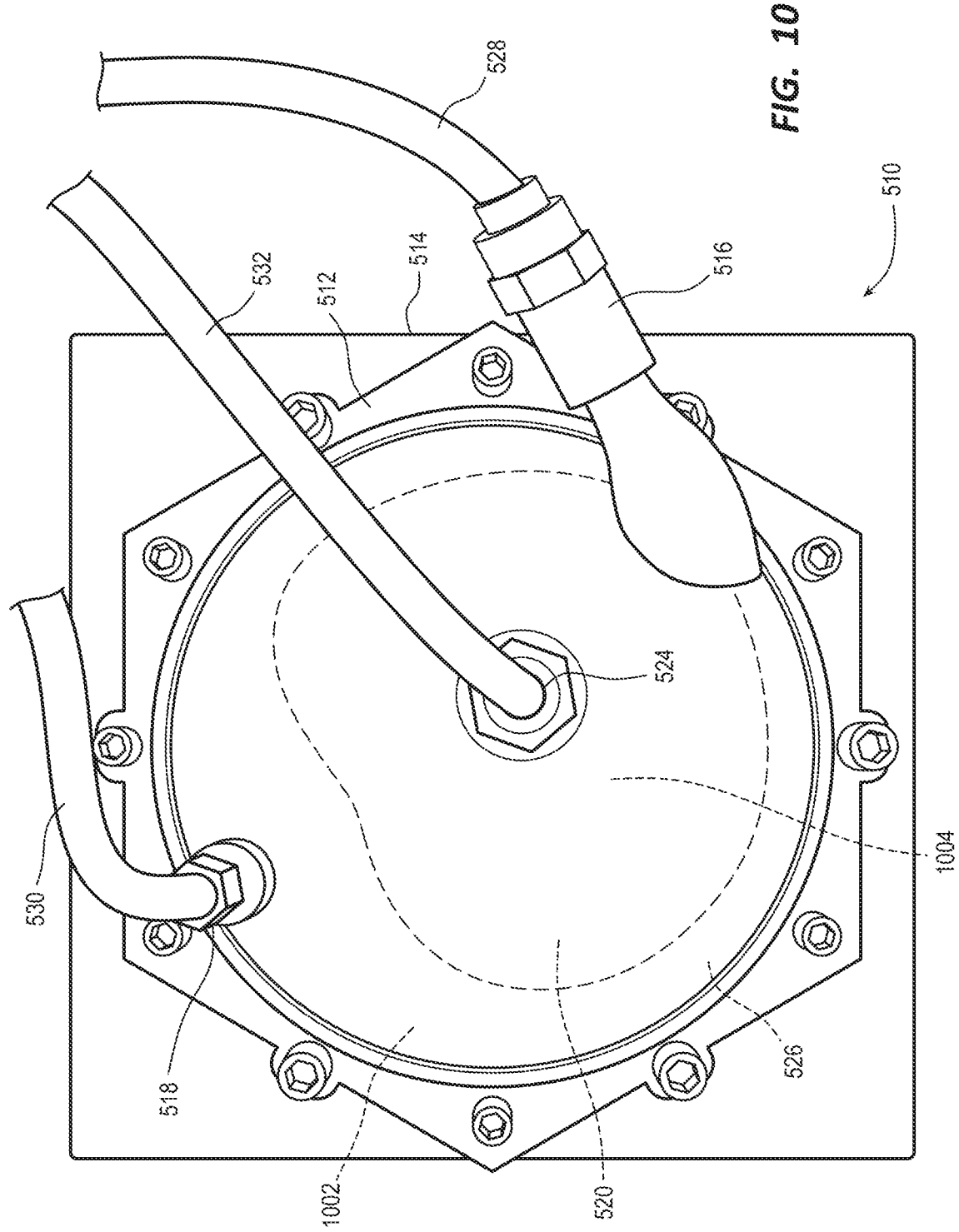
FIG. 10 is a top perspective view of another example phase separator in operation separating liquid and gas from a liquid/gas mixture.

FIG. 10 shows an example phase separator 510 in use separating liquid from gas within the chamber 520. FIG. 10 shows a liquid/gas mixture flowing into the inlet 516 via inlet line 528. Liquid flows out of the chamber 520 via the liquid outlet 518 into a liquid outlet line 530. Gas flows out of the chamber 520 via the gas outlet 524 via a gas outlet line 532. The liquid/gas mixture flows into the chamber 520 at a tangential angle as shown in FIG. 10, and flows into the channel 526 that extends around an outer periphery of the chamber 520. Liquid 1002 is separated from the gas 1004. The liquid collected around the periphery (e.g., within the channel 526) is directed out of the liquid outlet 518. The gas collected within the chamber 520 flows out of the gas outlet 524. In at least some arrangements, the phase separator 510 includes one or more features of the cooling system 602 shown in FIG. 7 to assist in condensing vapor within the gas volume 804 prior to the gas exiting through the gas outlet 524.

The phase separators 510 shown in FIGS. 5-9 are exemplary only. The relative size, shape and orientation for the features of the phase separator 510 may be altered in other embodiments. For example, the inlet 516, liquid outlet 518, and gas outlet 524 are arranged generally along a common line passing through a center of the phase separator 510. In other embodiments, the gas outlet 524 may be offset from a central point on the chamber 520, the liquid outlet 518 may be positioned offset circumferentially from the centerline passing through the gas outlet 524 and inlet 516, and/or the inlet 516 may be positioned at different orientations or at different locations along the first or second housings 512, 514. The perimeter may be other than circular in shape.

Figure 11:
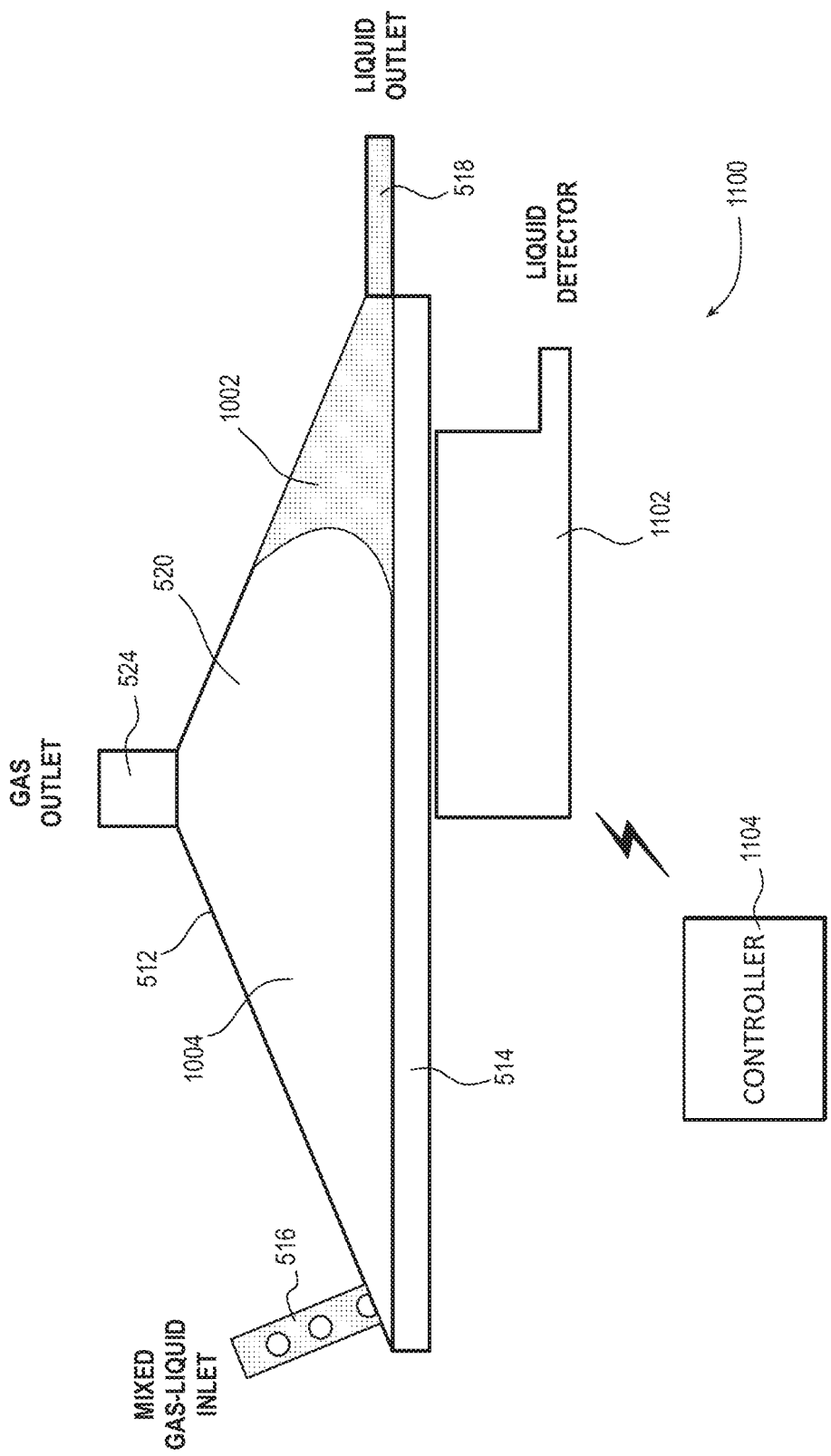
FIG. 11 is a side view of another example phase separator with liquid detector in accordance with the present disclosure.

FIG. 11 shows one example of a liquid detector 1102 that may be used as part of a phase separator system 900 to detect the presence of a separated liquid within the chamber 520 prior to drawing out the volume of liquid through the liquid outlet 518. The liquid detector may be used to stop the drain sequence once liquid is no longer detected. The liquid detector 1102 may be any of a variety of different types of devices that can determine whether a volume of liquid has collected at the liquid outlet 518. In one example, the liquid detector includes a liquid detection sensor positioned adjacent to or in the chamber 520 (e.g., along a bottom side of the second housing 514). An example liquid detector is a GEMS Sensors CAP-100.

The liquid detector 1102 may be in communication with one or more controllers 1104, such as a microcontroller or processor. The liquid detector 1102 may be connected wirelessly or with a wired connection to the controller 1104. The controller 1104 may control other operations and functionality of the system 1100, including, for example, operation of one or more pumps that deliver the liquid/gas mixture into the chamber 520 or remove the liquid and/or gas from the chamber 520. The controller at 1104 may control other operations such as, and for example, operation of the gas isolation valve, operation of a cooling system, or the like.

In at least some arrangements, the controller 1104 controls removal of liquid from the chamber 520 in response to detected volume of liquid at the liquid outlet 518. If the volume of liquid 802 is not detected, or is not of sufficient volume, the controller 1104 may operate to stop removal of the liquid through liquid outlet 518. The liquid detector 1102 may detect liquid at other locations, or a plurality of liquid detectors may be used to detect liquid at a variety of locations such as, for example, at other locations within the chamber 520 (e.g., at gas outlet 524), at a location downstream of the liquid outlet 518 (e.g., within line 530 shown in FIG. 10), or within the line 528 (see FIG. 10) that leads to the inlet 516.

The liquid detection disclosed with reference to FIG. 11 may help reduce the risk of drawing air into the liquid outlet if the chamber is over-drained of the liquid. In at least one example, a timer may be used to start a drain with consistent time intervals, in cooperation with or independent of a sensor. The use of a liquid detector may be helpful in initiating when a drain of liquid should start and stop. The liquid detection functionality of system 1100 may further include pump pressure interpretation and dual bubble detector correlation as described below.

Figure 12:
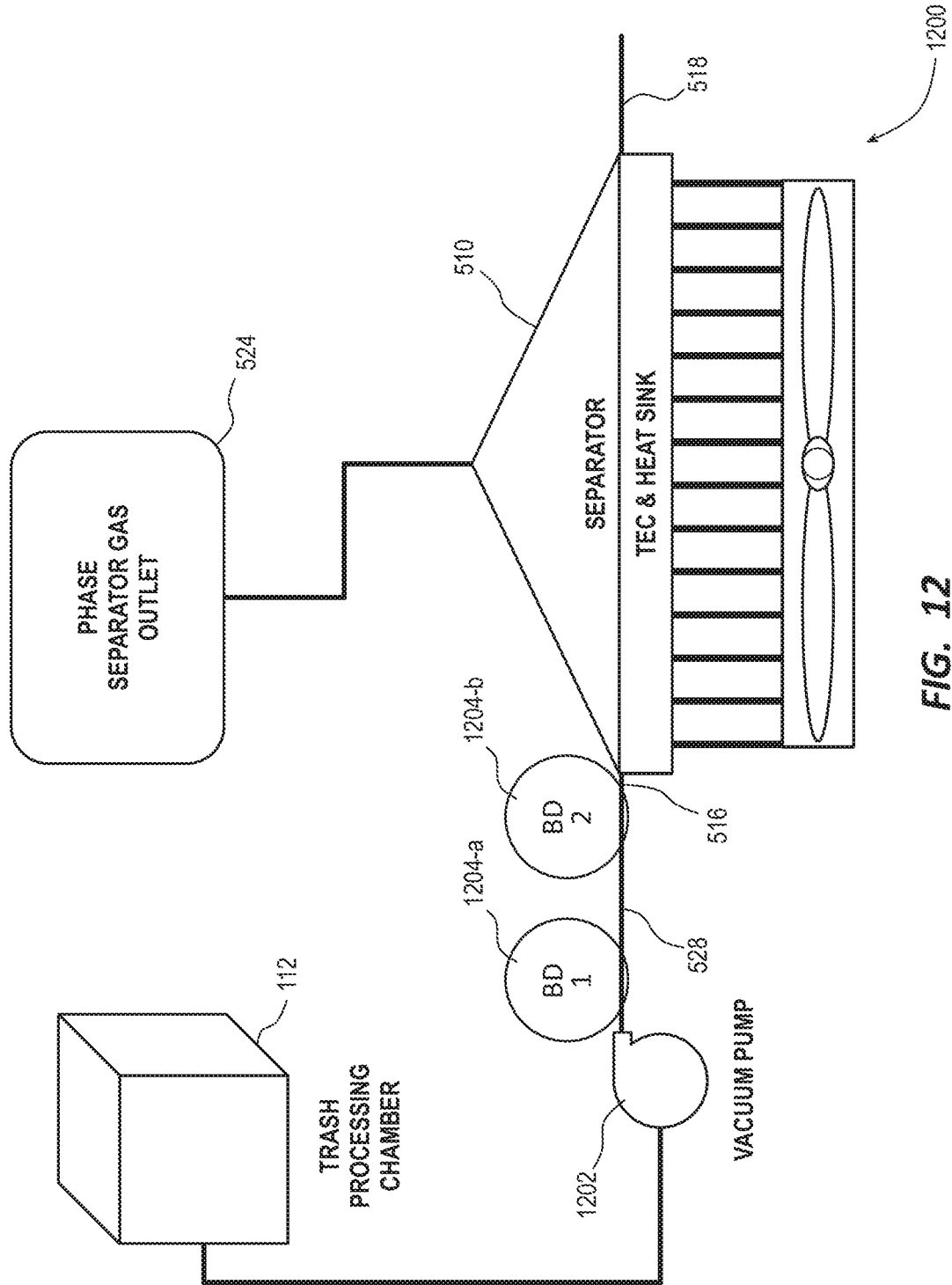
FIG. 12 shows another example phase separator system with bubble detection.

FIG. 12 shows an example phase separator system 1200 that includes bubble detection features. The system 1200 includes a phase separator 510, a mixed gas/liquid source 112, a vacuum pump 1202, a phase separator gas outlet 524, a liquid/gas inlet line 528 and inlet 516, and a liquid outlet 518. A plurality of bubble detectors 1204-*a*, 1204-*b* may be positioned in the inlet line leading to an inlet of the phase separator 510. The bubble detectors 1204-*a*-*b* may detect the presence of bubbles and/or liquid within the inlet line 528.

Figure 13:
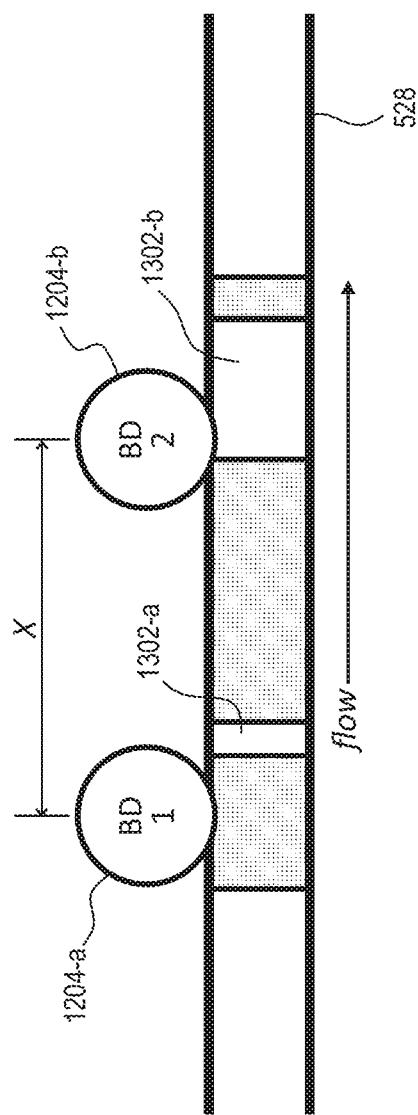
FIG. 13 shows bubble detector sensors of the system shown in FIG. 12.

FIG. 13 shows bubbles 1302-*a*, 1302-*b* that are separated by liquid within the line 528. The bubble detectors are separated at distance X from each other along the line 528.

Figure 14:
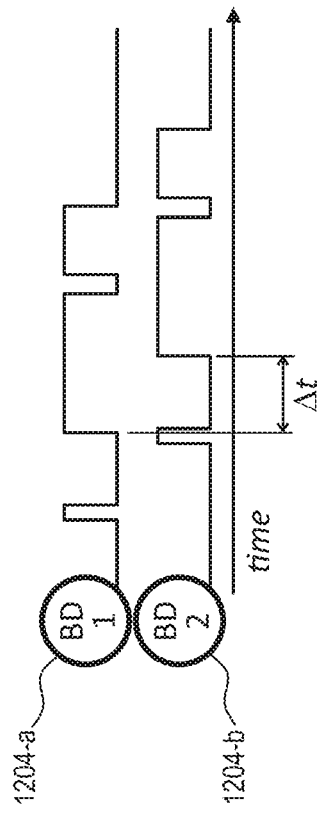
FIG. 14 is a graph showing output from the bubble detector sensors shown in FIG. 13.

FIG. 14 shows an output from the bubble detectors 1204-*a*-*b* over time. The change in time in combination with the distance x can be used to determine the size and/or volume of the air within the line 528 according to the following equation:

$$V = \frac{x \cdot A_{tubing}}{\Delta t} \qquad \text{Equation 2}$$

Where:

$V$=volumetric flow rate of the gas/liquid mixture

Generally, the signal shown in FIG. 14 is the output from the bubble detectors. A high signal indicates the corresponding bubble detector sees liquid in the line. A low signal indicates the corresponding bubble detector sees air in the line. By using two bubble detectors arranged at a known distance apart it should create nearly identical signals that are offset in time (i.e., the symbol tin Equation 2). By analyzing the time-shifted signals against each other with a cross-correlation algorithm, the amount of time offset can be calculated even if there are small differences in the shapes of the two signals (i.e., noise of some kind. Once the time offset ($\Delta t$) is known, the time offset can be used in Equation 2 along with the constants (i.e., tubing cross sectional area and bubble detector separation distance) to calculate the volumetric flow rate of the mixed phase flow at that instant. The volumetric flow rate may be integrated over time to understand the total volume flowed since the previous drain cycle, for example. Further, since the bubble detectors are sensing the phase state (i.e., air or liquid) of the volumetric flow, the volume integration can be selectively performed for liquid only, or both if it is desired to know gas volume for some reason. Thus, with two bubble detectors, it is possible to know how much liquid has entered the phase separator, with no need to physically sense that liquid. Since physically sensing liquid can be challenging in microgravity, the use of bubble detectors can be advantageous in microgravity environments. That information can then be used by the controller to turn on the pump when a specific volume of liquid has been reached. In at least some examples, this method may work more effectively if the mixed phase flow regime is slug flow (i.e., pockets of liquid and air alternate and each fully fill the tubing cross section). This is an alternative method to controlling the pump (e.g., alternative to the liquid detector 1102 of FIG. 11).

Figure 15:
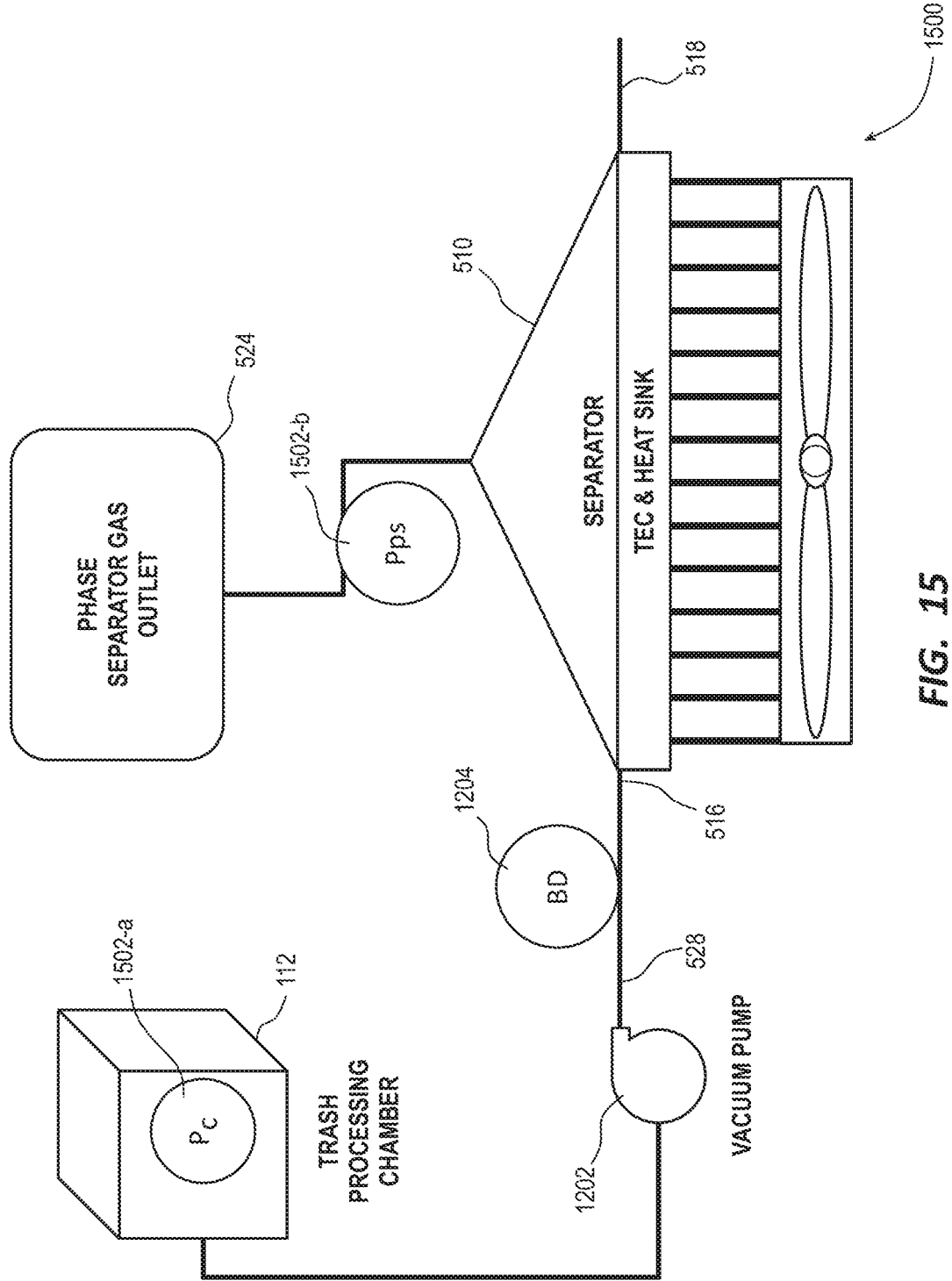
FIG. 15 shows another example phase separator system with bubble detection features in accordance with the present disclosure.

FIG. 15 illustrates another phase separator system 1500 that includes bubble detection and pressure differential within the system. The system 1500 includes phase separator 510, phase separator gas outlet 524, mixed gas/liquid source 112, a pressure sensor 1502-*a*, a bubble detector 1204, and a pressure sensor 1502-*b* positioned at the gas outlet 524. The flow rates (e.g., in liters per minute) can be calculated based at least in part on the pressure differential between pressure $P_s$ from sensor 1502-*b* and the pressure $P_c$ from sensor 1502-*a*. The bubble detector 1204 can assist with detecting when the flow is liquid in an inlet line 528. Integrated liquid flow over time would equal the liquid volume possible through the system 1500.

Another example method disclosed herein relates to deciding when to start the liquid/condensate pump. Pumps like the chamber pump shown in FIGS. 2 and 3 may have a specific pressure rise as a function of volumetric flow rate (i.e., characteristic pump curve). By sensing the pressure at the two locations described, the pressure differential across the pump can be determined. This pressure differential along with the characteristic pump curve allows the volumetric flow rate to be calculated. Similar to the dual bubble detector method, once the volumetric flow rate at an instant in time is known, it can be integrated over time to determine the total volume that has been flowed through the line. The bubble detector is used to sense when that volumetric flow rate is liquid, so the volumetric flow rate can be integrated over time for the liquid only so that specifically a liquid volume can be determined. Once a desired liquid volume has flowed into the phase separator the condensate/liquid pump can be started to drain the liquid.

In at least some of the systems disclosed herein, a controller, processor or other similar device may be used to provide control strategies for the system. For example, drain initiation, drain termination and secondary control functions may be implemented into the system and controlled via the controlling device. As an example, drain initiation options include, for example, a timer, a liquid detector, pump pressure interpretation, and dual bubble detector correlation, as described above. Drain termination may be based on a timer function, bubble sensors, or liquid sensors. A controller may also allow for detection of gas bubbles in the liquid outlet, and an automatic sequence to reverse the drain flow to return the bubble into the chamber where it can be separated, then returning to nominal drain operations.

Figure 16:
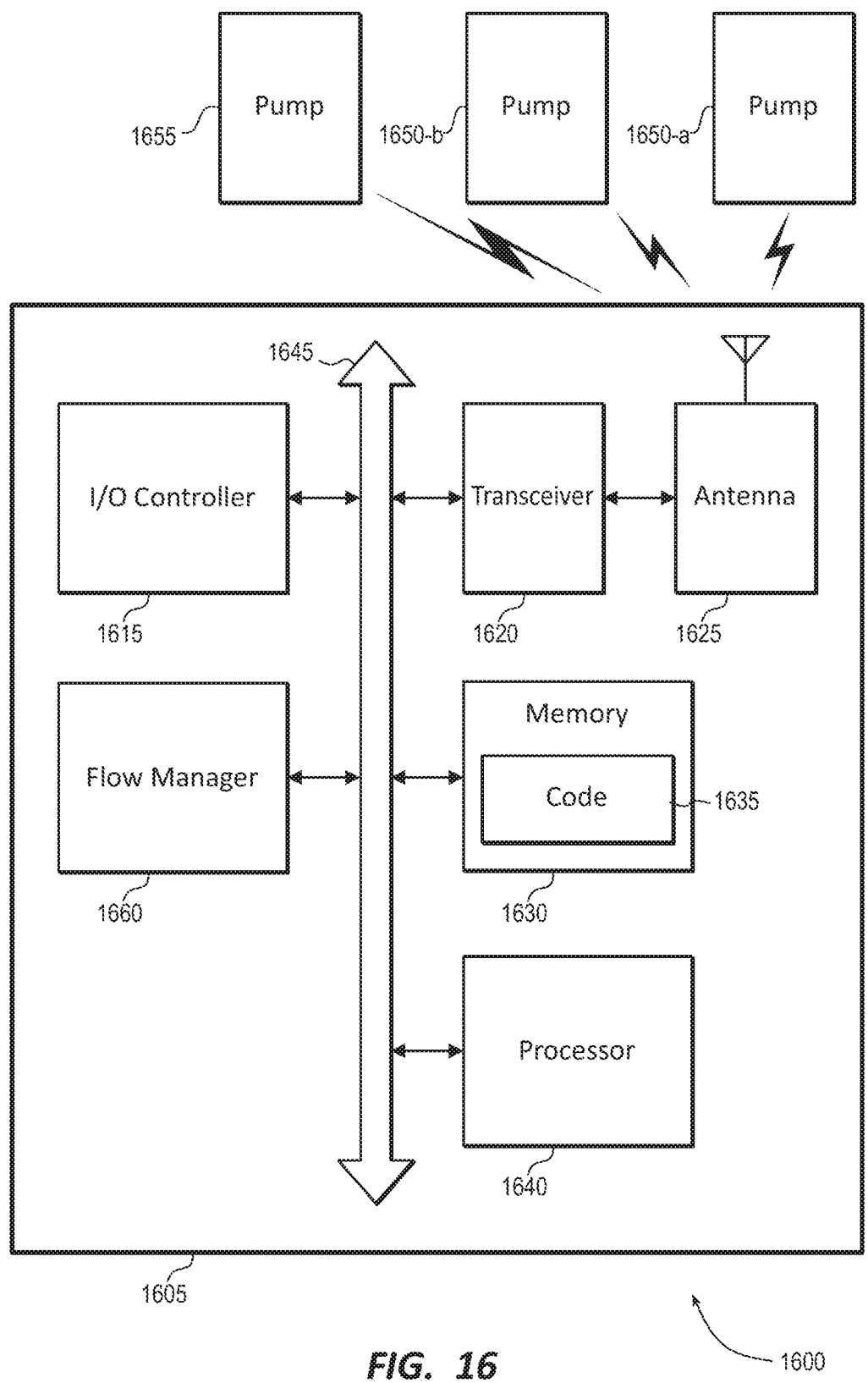
FIG. 16 is a block diagram of a system that is one example of the phase separator systems disclosed herein.

FIG. 16 shows a diagram of a system 1600 including a device 1605 that supports dynamic accessibility compliance of a website in accordance with aspects of the present disclosure. The device 1605 may be an example of or include the components of system 100, or other devices as described herein. The device 1605 may include components for transmitting and receiving communications, including a flow manager 1660, an I/O controller 1615, a transceiver 1620, an antenna 1625, memory 1630, and a processor 1640. These components may be in electronic communication via one or more buses (e.g., bus 1645).

The flow manager 1660 may provide at least some of the functionality related to the systems 100-1500 described above with reference to FIGS. 1-15. For example, the flow manager 1660 may monitor and/or control the pressures, bubble detection, and/or flow rates for the liquid/gas mixture input into the phase separator, the liquid drawn out of the phase separator, and the gas drawn out of the phase separator. The flow manager 1660 may monitor and/or control other features and functionality of any of the components and subsystems of the phase separator system.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-dOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions. The antenna 1625 may provide wireless communication with various components of a phase separator system, such as one or more pumps 1650 and sensors 1655.

The memory 1630 may include RAM and ROM. The memory 1630 may store computer-readable, computer-executable code 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting dynamic accessibility compliance of a website).

The code 1635 may include instructions to implement aspects of the present disclosure, including instructions to support dynamic accessibility compliance of a website. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
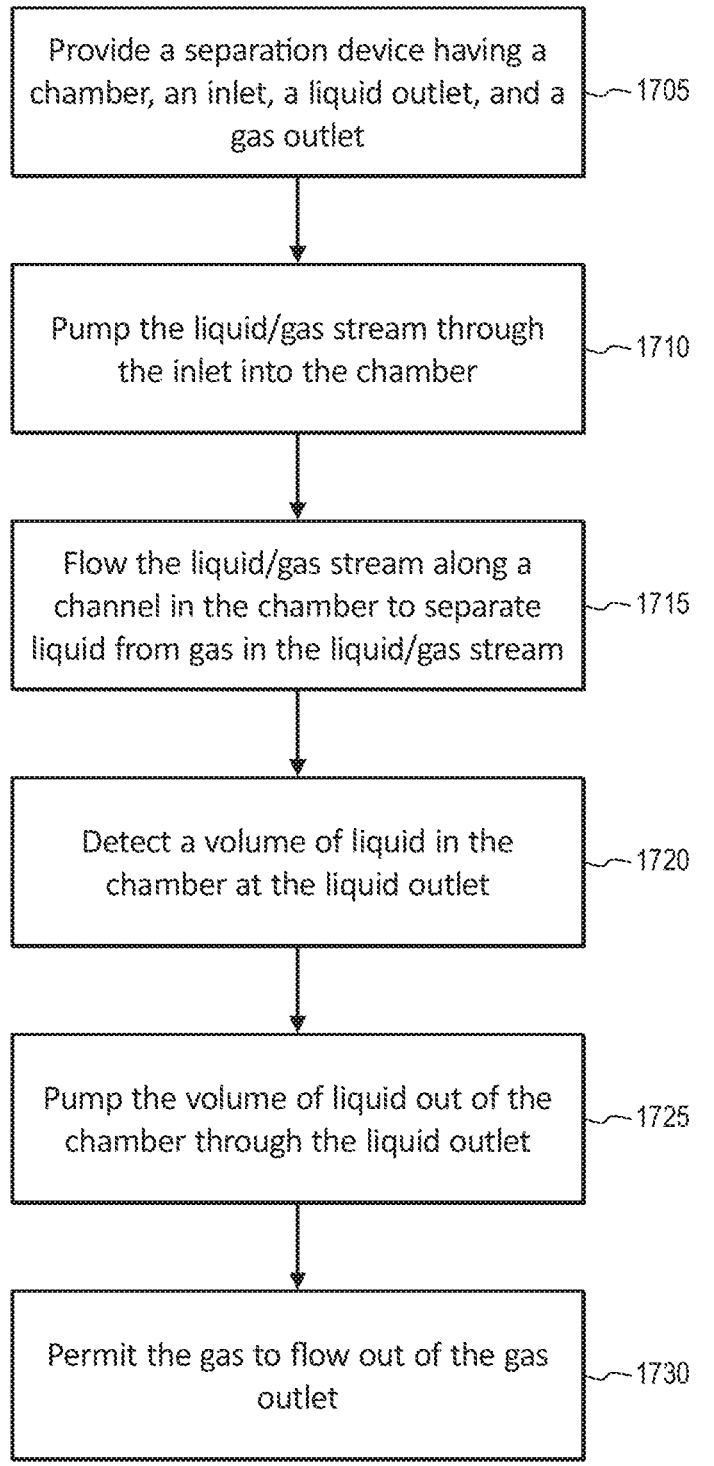
FIG. 17 is a flow diagram showing steps of an example method in accordance with the present disclosure.

Referring to FIG. 17, an example method 1700 related to separating liquid and gas from a mixed phase stream is described. The method 1700 may be one example of the features or functionality of any one of the systems disclosed herein with reference to FIGS. 1-16.

The method 1700 may include, at block 1705, providing a phase separation device having a chamber, an inlet, a liquid outlet, and a gas outlet. At 1710, the method 1700 includes pumping the liquid/gas stream through the inlet into the chamber. At 1715, the method includes flowing the liquid/gas stream along a channel in the chamber to separate the liquid from the gas. At 1720, the method may or may not include detecting a volume of the liquid in the chamber at the liquid outlet. At 1725, the method includes pumping the volume of liquid out of the chamber through the liquid outlet. At 1730, the method includes permitting the gas to flow out of the gas outlet.

Method 1700 may also include stopping the pumping the volume of liquid if gas is detected at the liquid outlet or in a liquid outlet line coupled to the liquid outlet. Separating the liquid from the gas may include popping or otherwise eliminating bubbles in the chamber using at least one surface feature positioned in the chamber. The method 1700 may include providing a controlled system, the control system to control pumping of the liquid/gas stream and/or the volume of liquid. The system may include at least one sensor configured to detect the volume of liquid and generate a sensor signal, and the controller may be operable to control pumping of the volume of liquid out of the chamber after the sensor signal indicates that sufficient liquid is present at the liquid outlet. In addition to or in place of detecting a volume of liquid in the chamber at the liquid outlet at 1720, the method 1700 may include a timing mechanism that automatically removes the liquid out of the chamber after a certain amount of time has elapsed from when the volume of liquid/gas mixture has been pumped into the chamber.

Another possible step of the methods disclosed herein may include detection (e.g., automatic detection) of bubbles in the liquid outlet line, and a following step of causing the liquid to flow back into the chamber from the liquid line to push the bubble back into the chamber where the bubble can separate from the liquid, followed by resuming the normal drain operation. Such step or steps may be referred to as "repriming" the liquid outline line. Some combinations of drain initiation and termination methods rely on reprime to prevent gas from making it downstream in the liquid outlet, while other methods prevent ingestion of any bubbles in the first place, and make it possible to omit reprime functions.

Many other methods related to manufacturing, assembly, operating and adjusting a phases separator system may be carried out using the various embodiments and functionality disclosed herein. The example method of FIG. 17 is exemplary only and may include more or fewer steps in other embodiments.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus to separate liquid from a liquid/gas mixture in a low gravity environment, the apparatus comprising:
   a chamber having a capillary channel around a perimeter of the chamber;
   a liquid/gas inlet to the chamber, the inlet oriented tangentially to the capillary channel;
   a liquid outlet from the chamber, the liquid outlet being positioned at the perimeter of the chamber to remove liquid from the capillary channel;
   a gas outlet from the chamber, the gas outlet being positioned away from the perimeter in the chamber to remove gas from the chamber;
   at least one groove or protrusion structure extending along an arc shape on the surface of the chamber, wherein the at least one groove or protrusion structure serves as a pinning edge configured to limit bubble formation within the chamber, wherein the at least one groove or protrusion structure has a sharp edge configured to pop a bubble within the chamber, wherein at least one groove structure includes a first groove structure positioned adjacent the liquid/gas inlet or gas outlet; and
   wherein the chamber has a wedge shape such that the chamber is narrow at the perimeter of the chamber and the chamber widens at a central region of the chamber in a region of the gas outlet.

2. The apparatus of claim 1, wherein the liquid/gas inlet is positioned on an opposite side of the chamber from the liquid outlet.

3. The apparatus of claim 1, wherein the chamber has a disc shape.

4. The apparatus of claim 1, further comprising a controller and at least one sensor, the at least one sensor to detect liquid at the liquid outlet and generate a sensor signal, and the controller to control flow of liquid out of the liquid outlet based on the sensor signal.

5. The apparatus of claim 1, further comprising a cooling device operable to reduce a temperature of a portion of the apparatus that defines the chamber to condense vapors and control a humidity or dew point of the gas leaving the chamber.

6. The apparatus of claim 1, further comprising at least one pressure sensor to determine a pressure condition in the liquid/gas inlet.

7. The apparatus of claim 1, further comprising at least one groove or protrusion structure positioned on a surface of the chamber, wherein the at least one groove or protrusion structure serves as a pinning edge configured to limit bubble formation within the chamber.

8. The apparatus of claim 7, wherein the at least one groove or protrusion structure has a sharp edge configured to pop a bubble within the chamber.

9. The apparatus of claim 8, wherein at least one groove structure includes a first groove structure positioned adjacent the liquid/gas inlet.

10. The apparatus of claim 1, wherein at least one groove structure includes a second groove structure positioned adjacent the liquid outlet.

11. The apparatus of claim 10, wherein at least one groove structure includes a third groove structure positioned adjacent the gas outlet.

12. The apparatus of claim 1, wherein the chamber is formed by a first housing member and a second housing member attached to the first housing member such the chamber is positioned entirely between the first housing member and the second housing member, wherein the first housing member forms an entire upper surface of the chamber and the second housing member forms an entire lower surface of the chamber.

13. The apparatus of claim 12, wherein the second housing is a cooler that reduces a temperature of the chamber.

14. The apparatus of claim 13, wherein the second housing comprises thermoelectric cooling.

15. The apparatus of claim 13, wherein the second housing is air cooled.

16. The apparatus of claim 13, wherein the second housing is liquid cooled.

* * * * *